(12) United States Patent
Hoffmann et al.

(10) Patent No.: US 7,817,589 B2
(45) Date of Patent: *Oct. 19, 2010

(54) SELF-CONTAINED PORTABLE BROADBAND COMMUNICATIONS SYSTEM

(75) Inventors: Christopher J. Hoffmann, Portland, OR (US); Jim Barber, Beaverton, OR (US); Rodney Snell, Portland, OR (US)

(73) Assignee: Pacific Star Communications, Inc., Portland, OR (US)

( * ) Notice: Subject to any disclaimer, the term of this patent is extended or adjusted under 35 U.S.C. 154(b) by 636 days.

This patent is subject to a terminal disclaimer.

(21) Appl. No.: 11/677,544

(22) Filed: Feb. 21, 2007

(65) Prior Publication Data

US 2009/0323568 A1 Dec. 31, 2009

Related U.S. Application Data

(63) Continuation-in-part of application No. 11/544,224, filed on Oct. 6, 2006, now Pat. No. 7,535,861.

(60) Provisional application No. 60/775,315, filed on Feb. 21, 2006, provisional application No. 60/775,300, filed on Feb. 21, 2006, provisional application No. 60/880,154, filed on Jan. 11, 2007.

(51) Int. Cl.
  *H04W 4/00* (2009.01)
(52) U.S. Cl. .................. 370/310; 370/328; 370/318; 455/556.1; 455/575.1
(58) Field of Classification Search ............... 370/310, 370/227, 328, 338, 466, 352, 311, 318, 400–401; 455/418–420, 403, 428, 424–425, 550.1, 455/552.2, 426.1–426.2, 554.1–556.1, 560, 455/575.1–575.8, 347; 361/690, 676, 678, 361/679, 687, 694–695; 725/62–63
See application file for complete search history.

(56) References Cited

U.S. PATENT DOCUMENTS

| 4,674,004 A | 6/1987 | Smith et al. |
| 4,972,453 A | 11/1990 | Daniel, III et al. |
| 5,081,707 A | 1/1992 | Schorman et al. |
| 5,159,685 A | 10/1992 | Kung |

(Continued)

FOREIGN PATENT DOCUMENTS

| WO | WO 99/59276 | 11/1999 |
| WO | WO-02/091692 | 11/2002 |
| WO | WO-2004/085622 | 10/2004 |
| WO | WO 2007/044880 A2 | 4/2007 |

OTHER PUBLICATIONS

U.S. Appl. No. 11/677,555, Kawasaki et al.
U.S. Appl. No. 60/880,154, Kawasaki.
U.S. Appl. No. 60/916,459, Ralstin et al.
Banton, Randy and Jaenicke, Richard. "Finely Managed Air Cooling for Deployed Military Environments," COTS Journal, Nov. 2003, 4 pages.

*Primary Examiner*—Kamran Afshar
(74) *Attorney, Agent, or Firm*—Perkins Coie LLP

(57) ABSTRACT

Systems and methods for establishing IT services in edge environments are described. A system of at least one embodiment comprises a transportable housing capable of being carried by personnel, a plurality of commercial off-the-shelf components contained in the housing and coupled together and configured to provide the broadband communications network, a management subsystem operatively coupled to the plurality of components, a network connection subsystem defined by at least a first portion of the plurality of components and configured to establish access to the broadband communications network, and a connection subsystem defined by at least a second portion of the plurality of components and that provides a user with a connection to the broadband communications network via the network connection subsystem.

20 Claims, 18 Drawing Sheets

U.S. PATENT DOCUMENTS

| | | | |
|---|---|---|---|
| 5,171,183 A | 12/1992 | Pollard et al. |
| 5,197,127 A | 3/1993 | Waclawsky et al. |
| 5,317,725 A | 5/1994 | Smith et al. |
| 5,377,196 A | 12/1994 | Godlew et al. |
| 5,388,189 A | 2/1995 | Kung |
| 5,422,787 A | 6/1995 | Gourdine |
| 5,508,941 A | 4/1996 | Leplingard et al. |
| 5,559,673 A | 9/1996 | Gagnon et al. |
| 5,657,641 A | 8/1997 | Cunningham et al. |
| 5,774,331 A | 6/1998 | Sach |
| 5,808,866 A | 9/1998 | Porter |
| 5,872,557 A | 2/1999 | Wiemer et al. |
| 5,875,242 A | 2/1999 | Glaser et al. |
| 5,917,904 A | 6/1999 | Theis |
| 5,974,457 A | 10/1999 | Waclawsky et al. |
| 5,995,376 A | 11/1999 | Schultz et al. |
| 6,003,068 A | 12/1999 | Sopko |
| 6,021,042 A | 2/2000 | Anderson et al. |
| 6,064,571 A | 5/2000 | Noble |
| 6,094,346 A | 7/2000 | Schweers et al. |
| 6,111,192 A | 8/2000 | Bell et al. |
| 6,130,819 A | 10/2000 | Lofland et al. |
| 6,185,481 B1 | 2/2001 | Kondou et al. |
| 6,198,628 B1 | 3/2001 | Smith |
| 6,202,291 B1 | 3/2001 | Toedtman |
| 6,206,480 B1 | 3/2001 | Thompson |
| 6,229,698 B1 | 5/2001 | Harvey |
| 6,242,691 B1 | 6/2001 | Reese et al. |
| 6,280,318 B1 | 8/2001 | Criss-Puszkiewicz et al. |
| 6,330,152 B1 | 12/2001 | Vos et al. |
| 6,345,294 B1 | 2/2002 | O'Toole et al. |
| 6,360,276 B1 | 3/2002 | Scott |
| 6,422,730 B1 | 7/2002 | Koren et al. |
| 6,434,120 B1 | 8/2002 | Natarajan et al. |
| 6,437,980 B1 | 8/2002 | Casebolt |
| 6,438,577 B1 | 8/2002 | Owens |
| 6,487,664 B1 | 11/2002 | Kellum |
| 6,499,609 B2 | 12/2002 | Patriche et al. |
| 6,525,935 B2 | 2/2003 | Casebolt |
| 6,525,936 B2 | 2/2003 | Beitelmal et al. |
| 6,529,502 B2 | 3/2003 | Sarkissian et al. |
| 6,535,865 B1 | 3/2003 | Skaaning et al. |
| 6,538,881 B1 | 3/2003 | Jeakins et al. |
| 6,545,863 B2 | 4/2003 | Huggins |
| 6,552,898 B1 | 4/2003 | Noble |
| 6,567,267 B1 | 5/2003 | Wang |
| 6,574,104 B2 | 6/2003 | Patel et al. |
| 6,587,335 B1 | 7/2003 | Nelson et al. |
| 6,598,183 B1 | 7/2003 | Grieco et al. |
| 6,603,662 B1 | 8/2003 | Ganrot |
| 6,614,811 B1 | 9/2003 | Alaimo et al. |
| 6,646,878 B2 | 11/2003 | Chan |
| 6,647,015 B2 | 11/2003 | Malkemes et al. |
| 6,661,657 B1 | 12/2003 | Banton et al. |
| 6,661,667 B2 | 12/2003 | Robbins et al. |
| 6,683,787 B1 | 1/2004 | Banton et al. |
| 6,690,575 B1 | 2/2004 | Banton et al. |
| 6,691,250 B1 | 2/2004 | Chandiramani et al. |
| 6,697,255 B1 | 2/2004 | Banton et al. |
| 6,704,196 B1 | 3/2004 | Rodriguez et al. |
| 6,719,149 B2 | 4/2004 | Tomino |
| 6,728,099 B1 | 4/2004 | Tsang et al. |
| 6,735,450 B1* | 5/2004 | Remmert ................ 455/550.1 |
| 6,741,463 B1 | 5/2004 | Akhtar et al. |
| 6,741,466 B1 | 5/2004 | Lebo |
| 6,747,872 B1 | 6/2004 | Patel et al. |
| 6,751,096 B2 | 6/2004 | Aldon |
| 6,759,588 B1 | 7/2004 | Banton et al. |
| 6,760,218 B2 | 7/2004 | Fan et al. |
| 6,765,793 B2 | 7/2004 | Kehret et al. |
| 6,781,831 B1 | 8/2004 | Banton et al. |
| 6,792,323 B2 | 9/2004 | Krzyzanowski et al. |
| 6,795,318 B2 | 9/2004 | Haas et al. |
| 6,801,428 B2 | 10/2004 | Smith et al. |
| 6,826,708 B1 | 11/2004 | Michalewicz |
| 6,853,637 B1 | 2/2005 | Norrell et al. |
| 6,856,816 B2 | 2/2005 | Porter |
| 6,857,012 B2 | 2/2005 | Sim et al. |
| 6,862,179 B2 | 3/2005 | Beitelmal et al. |
| 6,876,548 B2 | 4/2005 | Yatougo et al. |
| 6,876,736 B2 | 4/2005 | Lamy et al. |
| 6,879,486 B1 | 4/2005 | Banton et al. |
| 6,879,973 B2 | 4/2005 | Skaanning et al. |
| 6,889,376 B1 | 5/2005 | Barritz et al. |
| 6,906,918 B2 | 6/2005 | Rabinovitz |
| 6,909,611 B2 | 6/2005 | Smith et al. |
| 6,924,978 B2 | 8/2005 | DiStefano |
| 6,944,022 B1 | 9/2005 | Kehret et al. |
| 6,967,841 B1 | 11/2005 | Chu et al. |
| 6,968,958 B2 | 11/2005 | Lauchner et al. |
| 6,985,357 B2 | 1/2006 | Cauthron |
| 6,990,661 B2 | 1/2006 | Dobbek |
| 6,993,614 B2 | 1/2006 | Le et al. |
| 6,995,978 B2 | 2/2006 | Strauss et al. |
| 7,002,793 B2 | 2/2006 | Imsand |
| 7,012,805 B2 | 3/2006 | Shah et al. |
| 7,023,693 B2 | 4/2006 | Yuan et al. |
| 7,345,875 B2 | 3/2008 | Elkins |
| 7,535,861 B2* | 5/2009 | Buchholz et al. ............ 370/310 |
| 2001/0008482 A1 | 7/2001 | Corisis et al. |
| 2002/0061024 A1 | 5/2002 | Malkemes et al. |
| 2002/0072345 A1 | 6/2002 | Toth et al. |
| 2002/0114325 A1 | 8/2002 | Dale et al. |
| 2002/0161873 A1 | 10/2002 | McGuire |
| 2002/0167935 A1 | 11/2002 | Nabkel et al. |
| 2002/0176404 A1 | 11/2002 | Girard |
| 2003/0041237 A1 | 2/2003 | Mcelroy et al. |
| 2003/0051008 A1 | 3/2003 | Gorthy et al. |
| 2003/0137532 A1 | 7/2003 | Proulx et al. |
| 2003/0150823 A1 | 8/2003 | Dean et al. |
| 2003/0161453 A1 | 8/2003 | Veschi |
| 2003/0214782 A1 | 11/2003 | Osborn et al. |
| 2003/0235198 A1 | 12/2003 | McElroy et al. |
| 2004/0001088 A1 | 1/2004 | Stancil et al. |
| 2004/0003073 A1 | 1/2004 | Krzyzanowski et al. |
| 2004/0008717 A1 | 1/2004 | Verma et al. |
| 2004/0089618 A1 | 5/2004 | Lauchner et al. |
| 2004/0111574 A1 | 6/2004 | Pina et al. |
| 2004/0111598 A1 | 6/2004 | Jordan et al. |
| 2004/0111599 A1 | 6/2004 | Jordan et al. |
| 2004/0125558 A1 | 7/2004 | DiStefano |
| 2004/0130557 A1 | 7/2004 | Lin et al. |
| 2004/0131172 A1 | 7/2004 | Gill |
| 2004/0133734 A1 | 7/2004 | Jordan et al. |
| 2004/0133888 A1 | 7/2004 | Ard et al. |
| 2004/0136373 A1 | 7/2004 | Bareis |
| 2004/0142711 A1 | 7/2004 | Mahonen et al. |
| 2004/0165544 A1 | 8/2004 | Cornett et al. |
| 2004/0180653 A1* | 9/2004 | Royalty ..................... 455/431 |
| 2004/0190229 A1 | 9/2004 | Caci et al. |
| 2004/0198386 A1 | 10/2004 | Dupray |
| 2004/0215999 A1 | 10/2004 | Otto et al. |
| 2005/0047098 A1 | 3/2005 | Garnett et al. |
| 2005/0054289 A1 | 3/2005 | Salazar et al. |
| 2005/0060543 A1 | 3/2005 | Anspach |
| 2005/0089052 A1 | 4/2005 | Chen et al. |
| 2005/0099766 A1 | 5/2005 | Fraley et al. |
| 2005/0128689 A1 | 6/2005 | Caci et al. |
| 2005/0168926 A1 | 8/2005 | Lee et al. |
| 2005/0188092 A1 | 8/2005 | Short et al. |
| 2005/0198233 A1 | 9/2005 | Manchester et al. |
| 2005/0198239 A1 | 9/2005 | Hughes |
| 2005/0199459 A1 | 9/2005 | Harvey |
| 2005/0201053 A1 | 9/2005 | Scicluna et al. |

| | | |
|---|---|---|
| 2005/0213306 A1 | 9/2005 | Vos et al. |
| 2005/0232284 A1 | 10/2005 | Karaoguz et al. |
| 2005/0237716 A1 | 10/2005 | Chu et al. |
| 2005/0241810 A1 | 11/2005 | Malone et al. |
| 2005/0248043 A1 | 11/2005 | Bettridge et al. |
| 2005/0254210 A1 | 11/2005 | Grady et al. |
| 2005/0259383 A1 | 11/2005 | Ewing et al. |
| 2006/0015674 A1 | 1/2006 | Murotake |
| 2006/0018094 A1 | 1/2006 | Robbins et al. |
| 2006/0019655 A1 | 1/2006 | Peacock |
| 2006/0022562 A1 | 2/2006 | Li |
| 2006/0026509 A1 | 2/2006 | Porter |
| 2006/0034053 A1 | 2/2006 | Parish et al. |
| 2006/0044775 A1 | 3/2006 | Hoshino et al. |
| 2006/0050477 A1 | 3/2006 | Wu et al. |
| 2006/0071581 A1 | 4/2006 | Harvey |
| 2006/0133033 A1 * | 6/2006 | Straub et al. ............... 361/690 |
| 2006/0234691 A1 * | 10/2006 | Dygert ............... 455/418 |
| 2006/0251115 A1 * | 11/2006 | Haque et al. ............... 370/466 |
| 2007/0058339 A1 | 3/2007 | Hoffman et al. |
| 2007/0109984 A1 | 5/2007 | Buchholz et al. |
| 2007/0133168 A1 | 6/2007 | Shabany |
| 2007/0204324 A1 * | 8/2007 | Roberts et al. ............... 726/1 |

* cited by examiner

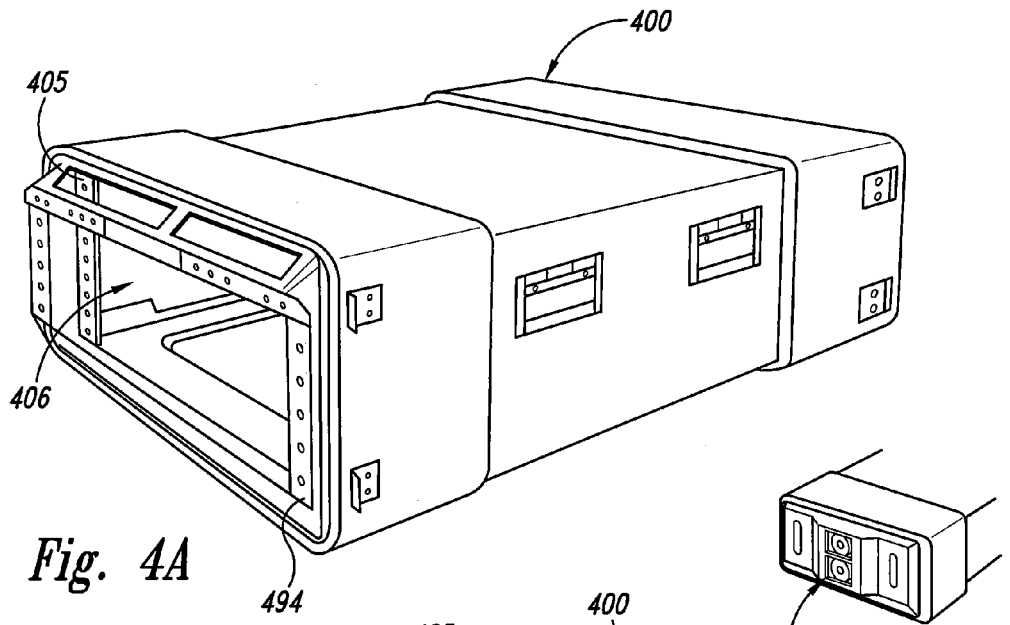
*Fig. 4A*
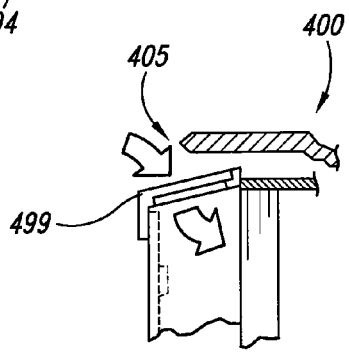
*Fig. 4C*
*Fig. 4B*
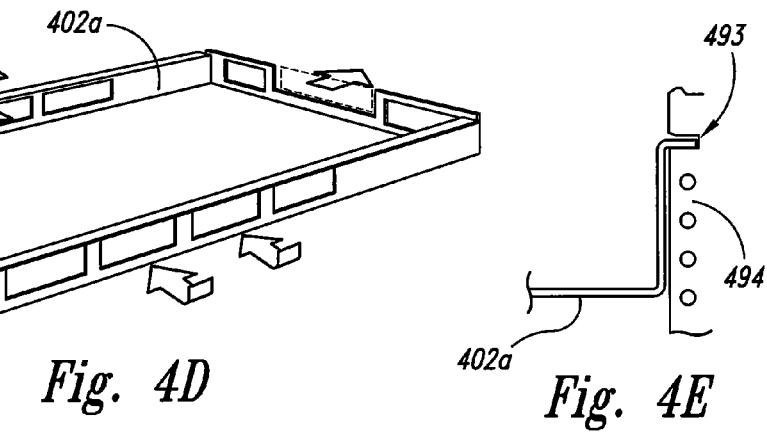
*Fig. 4D*
*Fig. 4E*

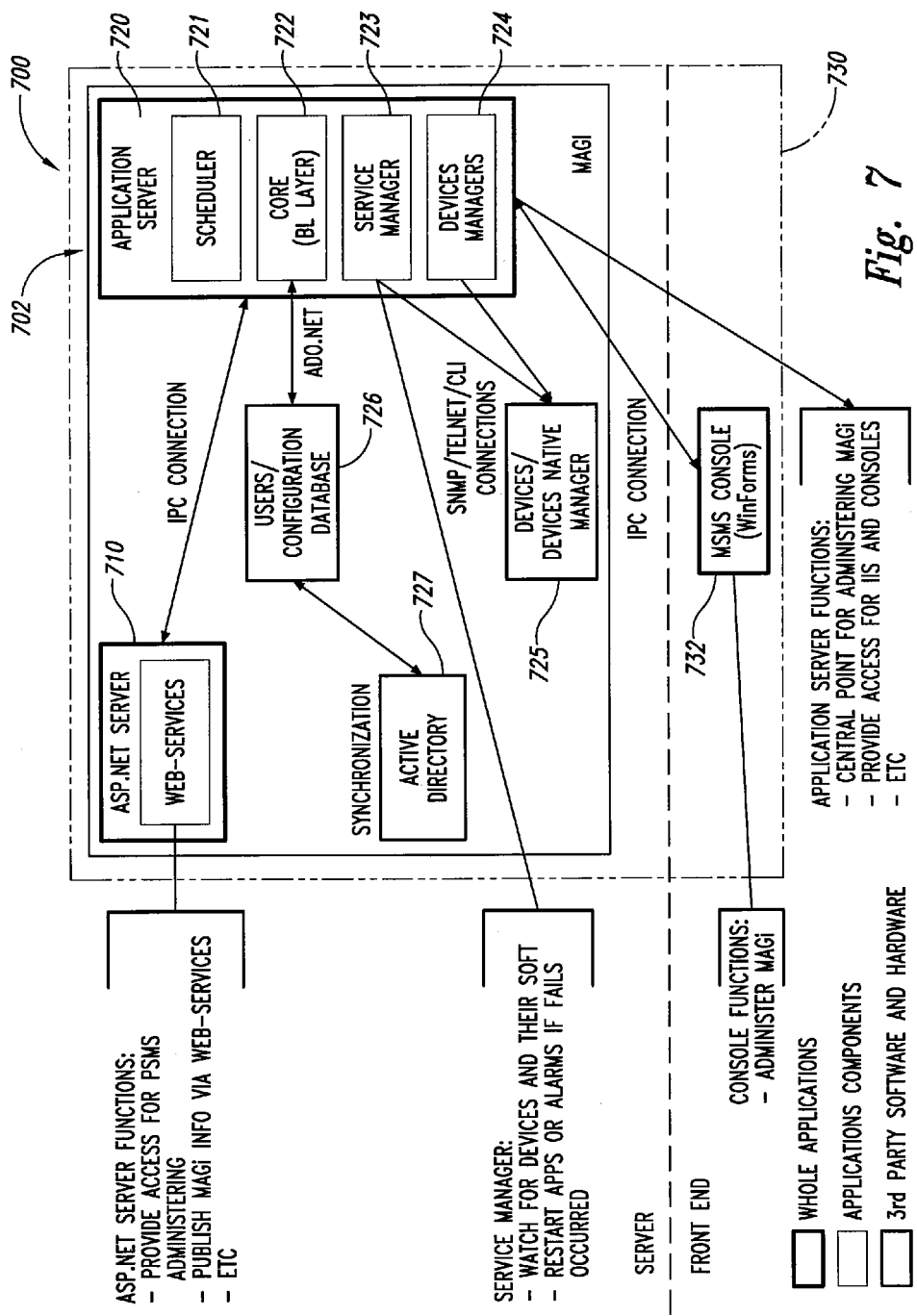

Pacific Star Communications -- MAGi 2.0

File View Help

Logged in as Operator. Logout

| System Status | Operations | Other Add-Ons |

MAGi Operations for Administrator    [MAGi]

MAGi

Change Alert & Log Options. Change alert severity levels and other settings, and add or remove email recipients for alerts and logs.

Change MAGi Password Reset the password for the MAGi.

Change MAGi System Settings Change MAGi rules and options for user passwords, software updates, remote management, and backups.

Check for Software Updates Check the Pacific Star Server for the any critical updates to MAGi system software.

Backup MAGi System Backup the MAGi system configuration to a secure external drive.

Restore MAGi System Restore MAGi to a previous backup state or its factory default configuration.

Network

Add a Wireless Remote. Install a wireless remote access point to extend network reach.

View Current Wireless Remotes. View, Change, or Delete a remote access point on the network.

Users

Add a New User. Assign a new user name and password, and grant permissions to use network phones and other shared services.

View All User Accounts. View, Change, or Delete accounts for existing network users.

File/Print Groups. Create, Change, or Delete groups of users with shared access to printers and file storage.

MSMS Admins & Operators. Create, Change, or Delete accounts for using this MAGi management software.

Phones

Phones & Extensions. Assign, change, or remove extensions for the phones on the network, including software phones.

Call Groups. Add, change, or remove automated calling groups that share an extension.

Class of Service Groups. Add, change, or remove Class of Service categories for phone usage rights.

Trunk Setup. Description...

Status bar

SELF-CONTAINED PORTABLE BROADBAND COMMUNICATIONS SYSTEM

CROSS-REFERENCE TO RELATED APPLICATIONS

This application is a continuation in part of U.S. patent application Ser. No. 11/544,224, entitled "Mobile Broadband Communication Systems, Such as a Deployable Self-Contained Portable System," filed Oct. 6, 2006, and claims priority to U.S. Provisional Patent Application No. 60/775,315, entitled "Flexi-Case Assembly" filed Feb. 21, 2006; U.S. Provisional Patent Application No. 60/775,300, entitled "Wizard-driven Configuration Management Software for Deployable and Mobile Broadband Communications and Data Appliance," filed Feb. 21, 2006; and to U.S. Provisional Patent Application No. 60/880,154, entitled "Intelligent Power Control," filed Jan. 11, 2007, each of which are incorporated herein by reference thereto.

This application is related to U.S. Patent Application 11/677,555 US entitled "Integrated Configuration and Management of Hardware Devices," which is being filed concurrently and which is hereby fully incorporated herein by reference.

BACKGROUND

There are many environments without a surrounding communications/data infrastructure required to support communications and information services equipment, such as equipment used to access a network or conduct phone calls. These environments include battlefields, harsh environments, disaster areas, buildings, construction areas, and so on.

As more facilities, companies, and organizations rely on IT and communications equipment to perform daily operations, there is a need to provide access in these environments. However, current attempts fail because many of the environments are inaccessible and transporting large quantities of equipment to the environment may be problematic or not feasible. For example, large amounts of equipment are more likely to be damaged during shipping, handling, setting up, or taking down of the equipment in a battlefield or disaster area. Environmental factors may also damage equipment. These factors may include heat, rain, wind, dust, vibrations, and/or rough handling.

Also, large quantities of equipment are generally more time-consuming expensive to install, set up, and maintain. The equipment may require many skilled technicians to assist in the installation and setup, adding further costs and problems. These systems may also require technicians to assist in configuration, security, monitoring, and maintenance of the equipment even after the initial set up. Additionally, it may be difficult to bring technicians and other skilled persons to some of the environments that require such IT and communications equipment.

Other problems associated with complex or sophisticated equipment may be a time consuming setup and configuration of the system, expensive or large power needs, expensive customization in design and security of a system, and so on. These and other problems exist in providing a computing, communications, and networking infrastructure in "edge" environments.

BRIEF DESCRIPTION OF THE DRAWINGS

FIG. 4A-I illustrate portions of an appliance in accordance with selected embodiments of the present invention.

FIG. 7 is a block diagram illustrating the software architecture of the management software employed by the system in accordance with certain embodiments of the present invention.

FIGS. 8A-8D are representative computer displays or web pages illustrating management functions of the management software in accordance with selected embodiments of the present invention.

DETAILED DESCRIPTION

Figure 1:
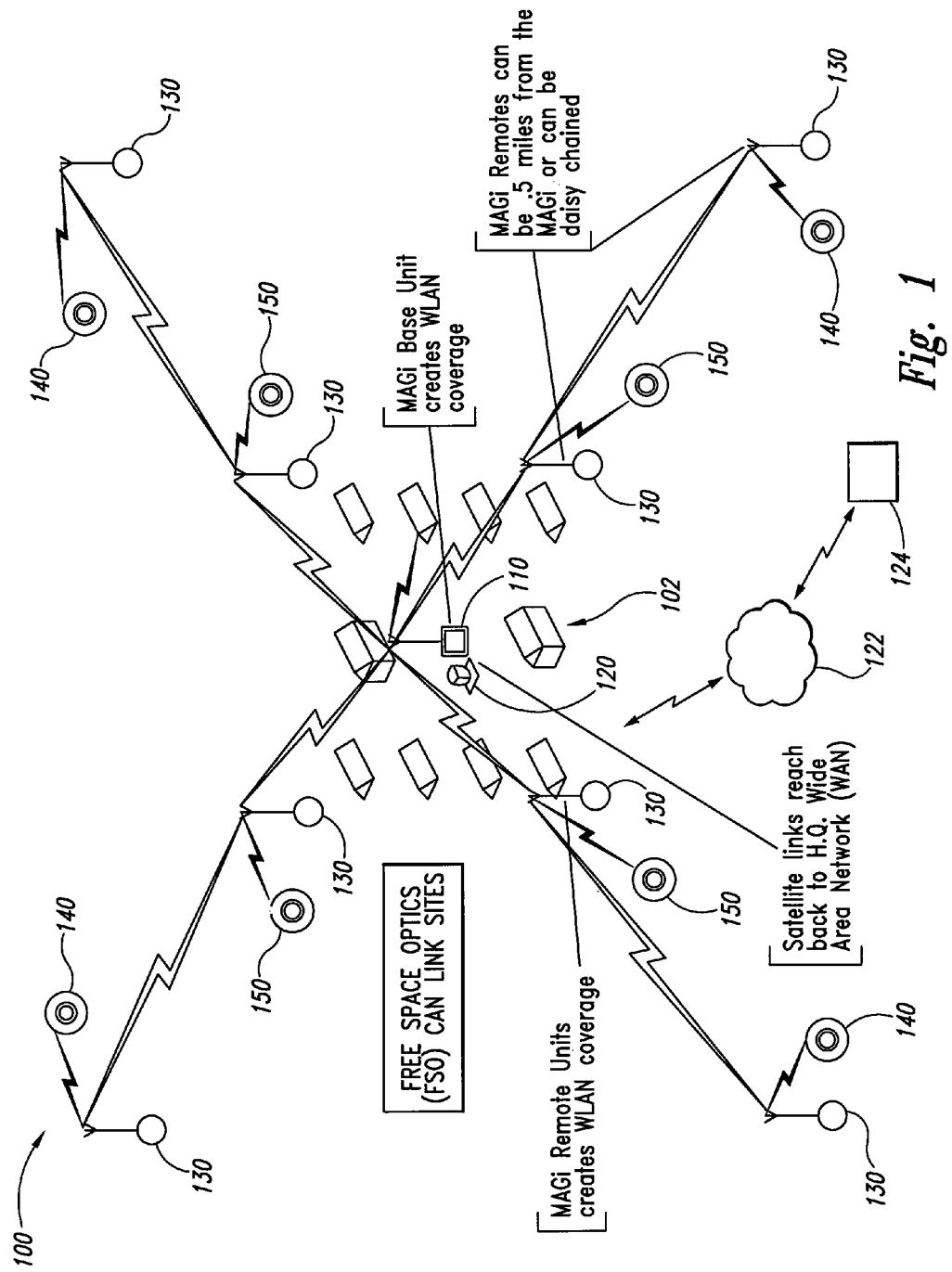
FIG. 1 is a block diagram of the system and its deployment in a suitable environment in accordance with embodiments of the present invention.

Aspects of the system in accordance with an embodiment of the present invention provide an appliance with a set of IT and communications services in an inexpensive, mobile, wired and/or wireless, environmentally resistant, easy to set up and administer package containing commercial off-the-shelf (COTS) components. The system minimizes the costs, time, and expertise required to deploy complete networking and computing infrastructure in "edge" environments by providing a comprehensive suite of networking, communications, and computational resources. "Edge" environments include, for example, geographical, economical, or temporal environments where network and computing resources are unavailable or are insufficiently capable of meeting the needs of organizations or individuals in such locations.

In one embodiment, the system provides a durable, transportable, mobile appliance with COTS components operatively coupled together to provide a communications network (e.g., a broadband communication network) that supports, as an example, Data, PBX, Voice, or Local Area Network (LAN) and/or Wide Area Network (WAN) communications for multiple users (e.g., over 100 users). The appliance includes an easily transportable, rugged, environmentally hardened case (or cases) that contains and protects the COTS components from shock, vibration, dirt, dust, heat, rain, water, wind, and other harsh or potentially damaging environmental conditions. In some cases, the system provides cooling equipment configured to cool the COTS components while operating in a high-temperature environment.

The COTS components are operatively coupled together in the case and configured to work together to provide a set of users with a preconfigured data/communications system requiring minimal user setup upon deployment. The appliance includes integrated software that may automatically set up, configure, maintain, monitor, and diagnose the COTS components, further reducing the need for on-site IT technicians.

The appliance in one embodiment provides computer-based wired and wireless communications (such as digital voice, data, and video), data networks, broadband data transmission, network access, network transmission, application services, data storage and security, and other "IT and communications services" delivered through "IT and/or communications equipment." In some aspects, the appliance provides such storage, access, and transmission services in "edge" environments on a temporary, emergency, or mobile basis.

The system with the appliance enables organizations, groups, individuals, and other entities to work, provide services, or collaborate in rugged locations, in locations on a temporary basis, or in other locations where a computing infrastructure is damaged, unprotected, inadequate, nonexistent, or otherwise incapable of meeting particular needs. Examples of such organizations include military groups, emergency relief agencies, medical teams, diplomatic and aid organizations, news organizations, dignitaries and delegations of traveling officials, law enforcement and emergency management agencies (such as agencies that respond to disaster areas), and so on. Other entities that may employ the system include organizations involved in ensuring reliable operations of infrastructure, such as health care organizations, organizations involved in energy production and transmission infrastructure, agriculture, banking, and transportation. Further, organizations involved in remote work projects such as oil exploration and extraction, mining, overseas construction, timber harvesting, or scientific exploration may employ aspects of the system.

The system in accordance with an embodiment can be used to create full office communications capabilities in network-starved environments or other environments. In some cases, the system can also provide extended coverage, such as with auto meshing units. An appliance can be used to enable communications, field management, surveillance, and other such capabilities at selected locations, such as prior to the establishment of permanent networking/computing capabilities.

The system is configured to have flexible capabilities that adapt to changing requirements due to, as an example, changing personnel, range expansion, modified operations, or the addition of new components to provide a desired functionality. An appliance can be used to provide capabilities at a plurality of different sites (such as temporary strategic military sites, disaster relief sites, historic sites, etc.) that may include changing personnel.

The system in one embodiment can be used to provide the above capabilities in settings where IT personnel or financial resources restrict near-term implementation of permanent facilities (such as fiber optic connections or high speed distribution networks). Accordingly, the appliance can be used to provide temporary capabilities while resource planning is underway. The system enables organizations to work with a full implementation of communications networks for interim periods, with little loss of productivity and little or no sunk costs. The system can also become an integral part of the facilities upon completion.

In one embodiment, the appliance includes a rugged case or package resistant to many environmental factors (rain, heat, dust, vibration, rough handling, etc.). In some embodiments, the rugged case can have a plurality of sections coupleable together and configured to securely retain and protect the COTS components therein. The case can include an integral rack system configured to receive and securely contain the COTS components. The case can, in another embodiment, include a plurality of removeable trays, drawers, or support members on which selected COTS components are mounted. The case can be configured to provide protection for the system at levels above military standards and specifications. The case can also include external housing structures (such as faceplates) that protect the internal components from tampering and provide easy access and identification of ports, jacks, indicators, and other external features.

The case can support a forced air cooling system, such as a high velocity forced air cooling system with custom ducting that enables the COTS components and system to remain cool in extreme conditions. In one embodiment, the tray assemblies in the case can include an air flow control system that directs the flow of cooling air over and/or through components on the drawer assemblies to keep the operating temperatures of the components below selected levels.

As indicated above, a plurality of COTS components are contained within the case. The COTS components can include a conventional server with robust hosting applications, such as an Intel-based Pentium 4 server that hosts applications, file and print services, and that works with many operating systems, such as Windows, Linux, etc. In one embodiment, the server is configured to run a comprehensive management subsystem or software management system that coordinates the operation and maintenance, monitoring and intelligent diagnostics of the system (including integrated remote management capabilities). The management software is discussed in greater detail below. The server is also configurable to run conventional operating system software, component-specific software, and/or other integrated software. In one embodiment, the appliance's server is an Innovations Solutions server that runs a Windows platform (e.g., Windows 2003 from Microsoft Corp.), although other suitable COTS servers can be used.

The server is operatively connected to one or more network switches (e.g., a POE switch) mounted in the appliance to provide local network capabilities for LAN connectivity as well as power for LAN devices. In one embodiment, the network switch is a Foundry 2402 POE switch. The switch is coupled to a firewall or other data security device that provides safe access to external networks. In one embodiment, the appliance utilizes a Juniper NetScreen 5XT or other FIPS 140 approved firewalls, which may include anti-virus filtering, filtering of objectionable content from the web, and intrusion prevention.

The network switch is also connected to a universal power source (UPS) that can be used to control the power flow to all of the COTS components. In one embodiment, the UPS is an MGE 1500 universal power source, although other UPS components can be used. The UPS can be coupled to a self-contained DC power source, such as a battery pack or other power source in the appliance. In another embodiment, the UPS may be coupled to an AC power source to provide power to the COTS components.

The appliance can include a COTS encryption gateway configured with conventional data encryption techniques. In one embodiment, an encryption gateway is provided, such as a FIPS 140 approved encryption gateway that provides military-grade encryption of data prior to transmission over the 802.11 wireless transports. Additional encryption support may be provided with an optional NSA Type-1 encryption that additionally or alternatively supports transmission of classified data over 802.11 (WiFi) wireless communications. In one embodiment, the appliance is provided with an Air Fortress 7500 encryption gateway configured with an AES 256 encryption protocol in accordance with military specifications.

The encryption gateway can be connected to a conventional access point, such as a wireless access/receiver that receives and directs data to and from the encryption gateway. In one embodiment, a wireless access point provided in the appliance is a Foundry IP 200 Access Point, although other access points can be used in other embodiments having an encryption gateway. In yet other embodiments, an encryption gateway may not be needed for the system.

The appliance also includes a fully contained phone system, including a COTS phone hub with jacks or other connectors, and phone software that runs on the server. The phone system includes a Voice over IP (VoIP) system that offers full PBX functionalities, such as Voice Mail, MLPP, and unified messaging. In one embodiment, the phone system includes a Sphere VG3 phone hub that works in conjunction with Spherical telephony software. Other COTS telecommunication services can be provided in the appliance, such as a hardwired 10/100 megabit WAN connection and POTs connections that support PBX and regular phone services. Other embodiments can use other telecommunications systems.

The appliance can also include a data input device, such as a rugged, durable, stowable keyboard coupled to the server. In one embodiment, the keyboard is a Keyboard Video Monitor assembly mounted to the case so as to be moveable between stowed and deployed positions. The keyboard can be installed on a moveable keyboard tray or pivotally connected to a portion of the case so as to allow the keyboard to be deployed or folded away and stowed in a safe location.

The appliance can also include one or more removable data storage devices coupled to the server, such as removable flash drives, hard drives, or disks for convenient removal of data. In some cases, the removable data storage devices are externally facing and are necessary for quick removal of data or other applications (such as during hostile situations), when extra drive capacity is required, for archiving purposes, and so on. The system may employ external USB connections that provide for configuration backup/restore of equipment settings and for quick removal of data. The appliance can also include externally facing removable medium drives (such as a DVD-RW drive) for loading software into the server or other COTS components in the appliance.

The system can also include one or more range extension components coupleable to the appliance to extend the boundary of the broadband communications network. In one embodiment, a plurality of advanced range extension components utilizing 54 Mbps wireless meshing are used to extend the range of the 802.11 wireless transport coverage. In another embodiment, a plurality of appliances can be physically spaced apart from each other and operatively interconnected so as to provide a very broad range of the resulting broadband communications network.

The system in accordance with the present invention provides an extremely flexible integrated system that allows for the combination and integration of a wide range of COTS components within a rugged, mobile, transportable case or cases that can be carried by personnel and easily deployed to provide a mobile broadband communications system having the desired operational capabilities for a particular use or configuration in an edge environment or other location. For example, aspects of the system may employ any number of COTS computers, networks (whether they are the Internet, a WAN, a LAN, wireless networks, cellular networks, 802.11 networks, voice, telephone services, fax, Virtual Private Network (VPN,) or other topologies), networking equipment (such as routers, switches, caches, modems, cable modems, firewalls, wireless access points, interface cards, or other networking interface devices) servers (Web, Application, File, Database, Authentication, DNS, and any other type of server), and/or client and server software (Applications, Software Services, Browsers, Plug-ins, Code Libraries, Drivers, and so on) that are configured or otherwise connected such that the individual, or sum of the components, are utilized in any fashion to create a mobile or deployable data and communications appliance that may be used in "edge" environments by technical or non-technical personnel.

Examples of the system will now be described for purposes of illustration. The following description provides specific details for a thorough understanding and enabling description of these examples. One skilled in the art will understand, however, that the system may be practiced without all of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Referring to FIG. 1, a block diagram of the integrated broadband communications system 100 in accordance with at least one embodiment is shown at a communications center 102, such as a command center, a base camp, or other selected location. The illustrated system includes an appliance 110 coupleable to a communications module 120 (or other communications modules not shown) and to remote units 130 that extend the range of communications to and from the appliance. The appliance provides voice and/or data communications from the communications center to other locations via the module 120 or other wireless or wired data/voice communications devices. For example, in one embodiment the communication module 120 includes a satellite communication module capable of communicating with a remote communication system and/or a remote computing system 124 via a satellite network 122. In other embodiments, the communication module 120, communication and/or computing system 124, and network 122 can have other arrangements.

The system 100 may be used to provide communications between portions of a communications area defined by the appliance and one or more remote units. For example, observation posts 140 and perimeter security posts 150 may utilize the appliance when communicating to sites in the camp or to sites off location. Additional sites or additional appliances (not shown) may also communicate with the central appliance. These additional sites or appliances may communicate with the central appliance via the remote units 130, or may employ free space optics or other communication techniques, such as longer range communication techniques.

Figure 2:
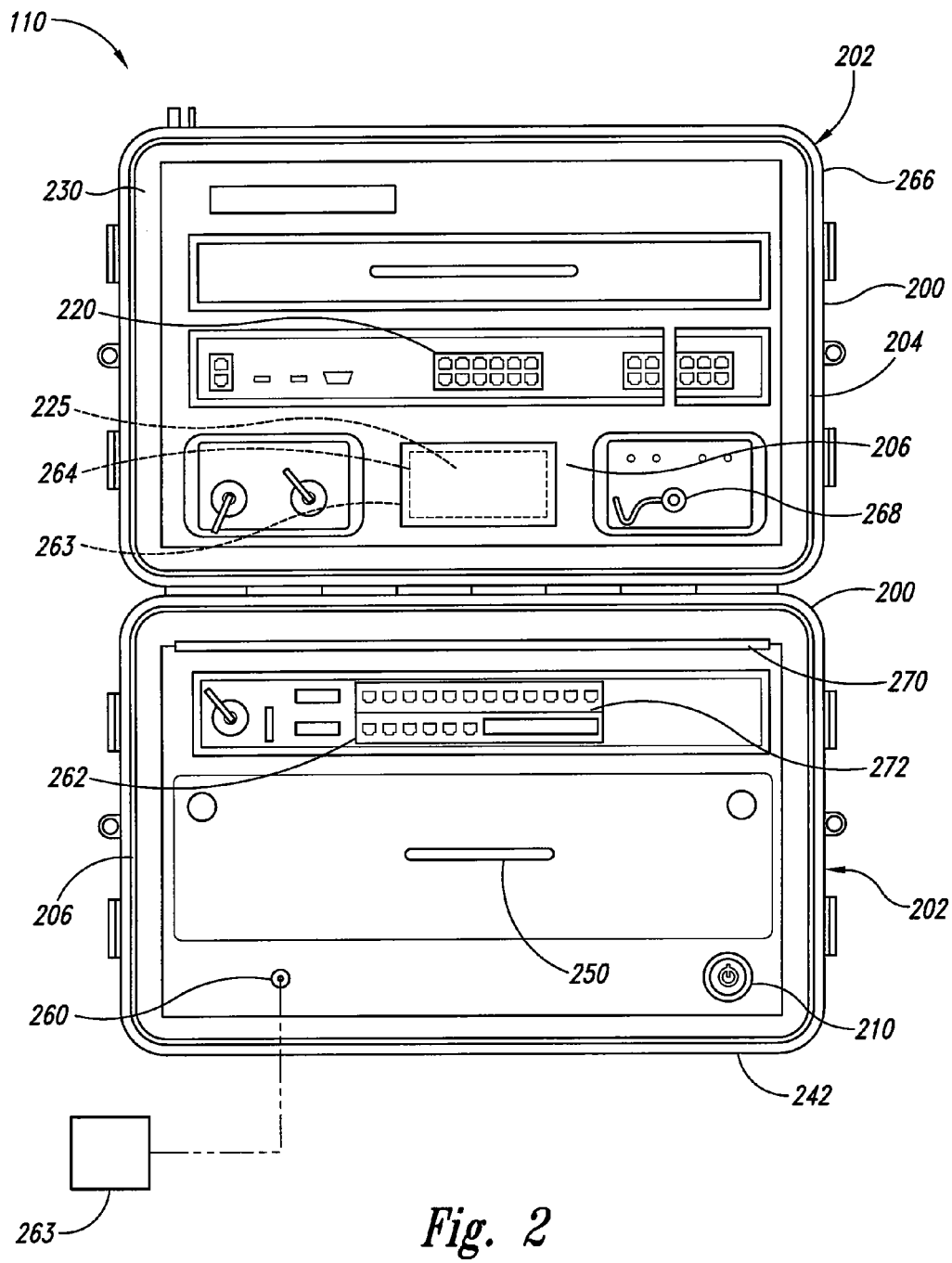
FIG. 2 illustrates a front, exterior view of an appliance in accordance with selected embodiments of the present invention.

FIG. 2 is a front, exterior view of an appliance 110 in accordance with at least one embodiment. The illustrated appliance includes a pair of rugged cases 200 that contain a plurality of COTS components 202 mounted in a compact manner within the cases. The cases 200 form enclosures around the COTS components 202 that shield and protect the COTS components. Each case is configured to be carried by personnel. In one embodiment, the case is designed to be carried by two people. In another embodiment, the case is designed to be carried by one person. Accordingly, the appliance is mobile and can be deployed with a minimal amount of man-power. In selected embodiments, each case includes an open front side 204 that allows access to at least the front sides of the COTS components. In one embodiment, a cover (not shown) can be attached to the open front side of the case to fully enclose all of the COTS components so as to provide protection for the components, such as when the appliance is not in use, is in transport, or is in the process of being deployed.

The appliance may include face plates 206 adjacent to the open front side and attached to the COTS components to protect the equipment from damage. The faceplates can have openings designed to expose user-serviceable items on the COTS components inside the case. The face plates can also be configured to cover portions of the components that are not intended to be user-serviceable items, such as reserved ports and selected switches, fuses, selected circuitry, or other features that should not be adjusted upon deployment of the appliance. In still other embodiments one or more COTS components can be operably coupled to the face plate (e.g., wired to the faceplate) so that a user can interface with the one or more COTS or other portions of the appliance 110. For example, in selected embodiments the face plate can include displays, USB ports, and/or the like for use by an operator in interfacing with portions of the appliance 110.

In the illustrated embodiment, the appliance 110 provides an integrated power button 210 coupled to the COTS components 202 and configured so that when the power button is activated, all of the COTS components receive power and automatically boot up in a selected sequence (as controlled by the server) to create the active broadband communication system. Accordingly, the appliance is configured such that the entire mobile broadband communication system can be activated by pressing a single power button. In the illustrated embodiment, the COTS components are configured so as to power up and boot up to provide the IT services in a matter of a few minutes, including services such as dial tone, WAN, LAN, WLAN, File/Print services, management services, and other selected services.

The appliance 110 of the illustrated embodiment includes the single power button 210 in a location so as to be exposed to the outside of the case for easy access. The power button 210 in other embodiments may be attached to the case, to an internal structure of the case, on special brackets, directly to the IT equipment, or in other configurations. The illustrated embodiment utilizes a power button, although other embodiments can use other on/off switches are mechanisms to activate and deactivate the appliance.

The illustrated appliance 110 has a plurality of input and/or output ports 220 (such as ports provided on the COTS components 202) that allow peripheral devices to quickly and easily connect to a selected COTS component in the appliance. For example, the input/output ports could be used to connect computers (e.g., laptop computers), phones, LAN/WAN connections, USB devices, and other peripheral devices. The ports may be externally located and may include communications ports, such as WAN, USB and Serial connections that connect to the COTS IT equipment via internal circuits or wiring provided by the system. For example, as discussed above, the ports can be located on a face plate associated with a COTS component. These connections provide for easily and quickly establishing the communication with the internal IT devices, thereby allowing the appliance to reinforce the components and house them in a secure and protective manner.

The illustrated appliance 110 has a COTS server 225, such as the server discussed above, supported in the case and operatively coupleable to a removable hard drive 230. The removable hard drive 230 may comprise a USB-connected removable hard drive or thumb drive, which may be encased in a custom designed plastic clam-shell "docking bay." The bay may hold the USB connector and may provide for reliable registration of the USB drive to a USB connector that communicates with an internal server. The removable hard drive can be plugged into the appliance, and data, files, software, or other information can be saved from the server or uploaded onto the server.

In the illustrated embodiment, each case 200 of the appliance 110 contains different COTS components that work together to provide the mobile broadband communications system. The COTS components in the two cases are operatively coupled together by power and data cables that interconnect the cases and their respective COTS components. In the illustrated embodiment, each of the two cases are shaped and sized to allow one or two people to be able to carry, transport, and deploy each case during transportation or deployment. Each case can be configured with handles to increase the ease with which the cases and their COTS components can be moved by personnel. In other embodiments, all of the COTS components can be contained in a single case that can be readily transported and moved for deployment in a selected location.

The appliance 110 in the illustrated embodiment includes a storage area 250, such as a drawer, shelf, or other type of storage area. This storage area may house operator's guides and manuals, tools, accessories, equipment, or other items. In some configurations of the appliance and its COTS components, the system includes operation manuals, including custom-developed manuals that provide instructions for setup, quick start, error handling, configuration, and other operational steps of the system. These documents may also be available "online" via the management software.

The appliance 110 of the illustrated embodiment has a power supply or power subsystem 260 (such as a universal power supply "UPS") that is connected to, or includes, the single power button 210. The power subsystem 260 can be operatively connected to the other COTS components 202. In selected embodiments, the power subsystem 260 can be coupleable to an external power source 263 such as a generator, public utility, or the like, and can carry and/or manage the flow of electrical power to the COTS components 202. In certain embodiments, the power subsystem 260 can include a battery that provides back up electrical power in the event that the external power source fails or is disconnected. In still other embodiments, the power subsystem 260 can be the sole source of power for the appliance 110. For example, in selected embodiments the power subsystem 260 can include a power generating system such as a generator.

The appliance also has a plurality of communication inputs 262 (such as POTS lines, T-1 lines and other digital communication links) coupled to the network switch (not shown), the phone hub (not shown) or other COTS components. The appliance also include server 263 that runs management software 264 used to control and manage the system, as discussed in greater detail below. The illustrated appliance also has an antenna 266 (such as a built-in antenna) used to provide the wireless network to a surrounding area.

The appliance also includes one or more USB ports 268 coupled to the sever and configured to enable system-wide backup, configuration modification, configuration restoration, and/or other data transfer to a removable data storage medium, such as a flash drive memory stick or other device. The appliance also includes a plurality of jacks 272 or other plug devices coupled to the phone system to allow for easy and fast access to the system for analog phones and other secured communication devices.

Figure 3:
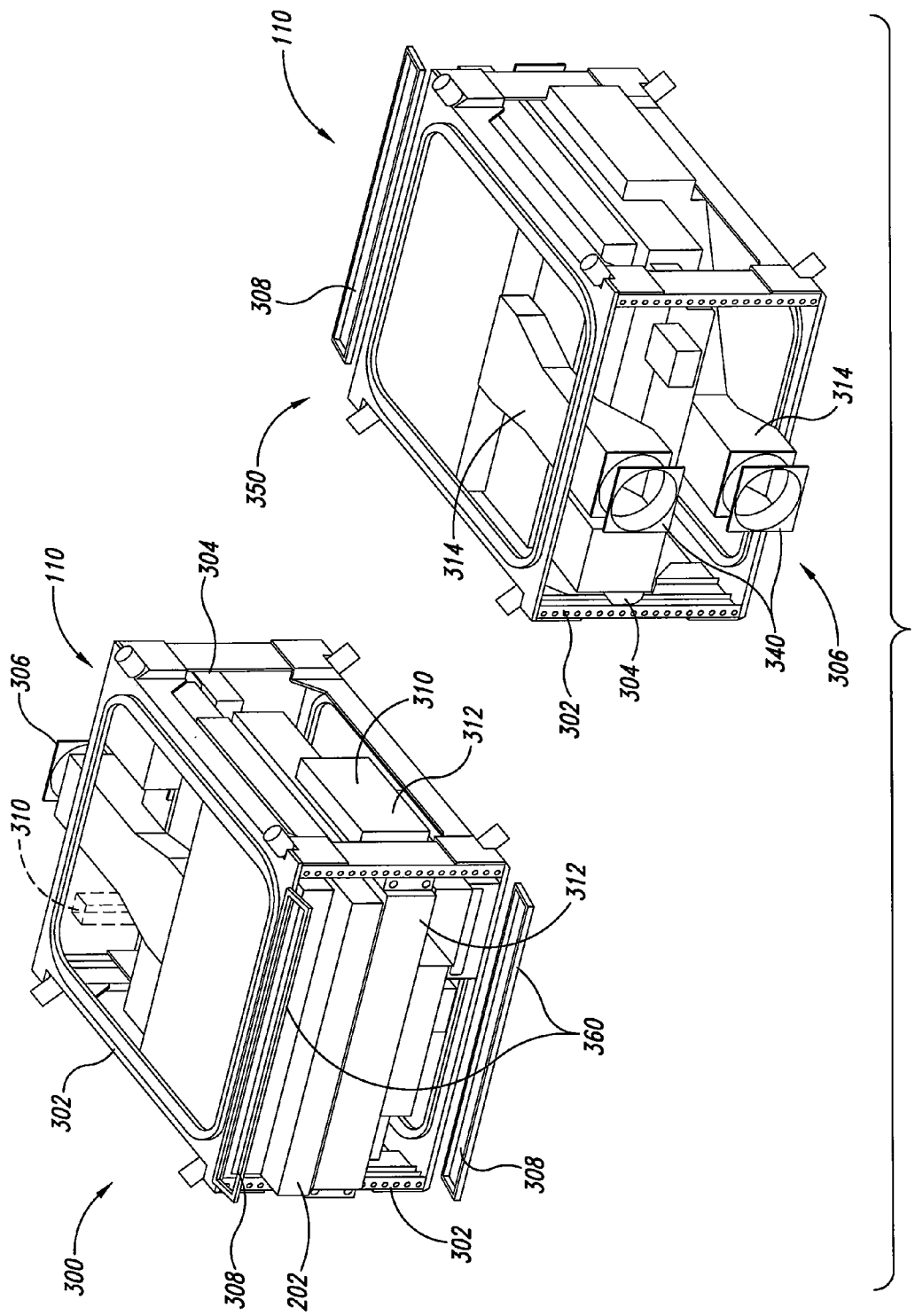
FIG. 3 illustrates an interior of an appliance in accordance with certain embodiments of the present invention.

Referring to FIG. 3, a front view 300 and back view 350 of the interior of the appliance 110 is shown. In some examples, the interior of the appliance 110 comprises reinforcing brackets 302, rack components 304 that support the COTS components 202, a cooling system 306, an air filter system 308, and a custom wiring harness 310. The illustrated cooling system is a high-velocity air cooling system that pulls high-velocity air through the air filters, into one or more intake ducts 312, directly through selected COTS components, and out through exhaust ducts 314.

The cooling system 306 of the illustrated embodiment includes high-velocity, variable speed, electronically controlled axial fans 340 connected to the exhaust ducts 314 and positioned to pull the air through the air filter system, through the duct work, and directly into or out of existing air vents in the selected COTS components. The fans 340 are driven by custom electronics coupled to the server and that adjust the fan speed based upon the appliance's internal temperature.

In one embodiment, the air filter system 308 has one or more removable air filters and the inlets are sealably connected to the faceplates of the cases for a controlled air flow path into the ducts to provide for effective cooling and temperature regulation of the internal components. In other embodiments the cooling system can have other arrangements. In some embodiments, visual indicators, such as LEDs, on the outside of the case are provided to indicate when fans are turned on or when the internal temperature is above or below what is recommended. The indicators may also monitor other aspects of the internal environment of the system, such as impurities of the air, and the functionality of the filters, ducts, or fans. Further details describing the cooling system may be found in U.S. patent application Ser. No. 11/435,355, entitled "High Velocity Air Cooling for Electronic Equipment," filed May 16, 2006, which is fully incorporated herein by reference.

FIG. 4A-I illustrate portions of an appliance in accordance with selected embodiments of the present invention. In the illustrated embodiment, a rugged case 400 is configured with air intake areas 405 configured to receive air filters 499 (shown in FIG. 4C, which is a partially schematic cross-sectional side elevation of a portion of the air intake area 405) and to allow air to flow into the case's interior area 406 and along an air flow path through the trays and through the COTS components. In one embodiment, the trays are removable from the case to allow access to the COTS components. The trays of the illustrated embodiment are drawer-like trays slideably received by the case and moveable relative to the case between stowed and pulled-out positions. The COTS components and their power and connection cables are securely fixed and non-moveable relative to the trays. When the trays are in the stowed position, the COTS components are securely fixed, enclosed, and protected within the case. When the trays are in the pulled-out position, the COTS components can be exposed to allow access to the COTS components if needed. The trays and COTS components are configured with seals that engage the case or adjacent trays to direct airflow over and/or through the COTS components to cool the components within the case during operation. The trays 402 (shown as a first tray 402a in FIGS. 4D-4G and a second tray 402b in FIG. 4H) can also be configured with a plurality of power and data connectors 408 that connect to one or more COTS components positioned on the trays 402. The connectors are adapted to mate with compatible connectors on an interface panel within the rugged casing. The interface panel is adapted to connect to each of the trays/connectors, thereby operatively connecting to each of the COTS components when the tray is in the stowed position. When all of the trays are in the stowed position, the COTS components (e.g., the main server, the USB, and other components) are connected to the interface panel, and thereby allowed to communicate between each other for operation of the entire system. The interface panel of one case 400 is also operatively connectable to the interface panel of another case so as to operatively join the COTS components together in each of the rugged casings. As discussed in further detail below, in selected embodiments the connectors and interface panel can make up a portion of an interconnect subsystem.

In one embodiment, each tray 402 with COTS component(s) thereon are configured with a uniform size and shape, so a drawer and its COTS components can be unplugged from the interface panel, removed from the case as a unit, and replaced with another tray with similar or different COTS components. This replacement drawer and its COTS components are automatically integrated into the system upon plugging into the interface panel, so as to be able to receive power and to communicate with the other COTS components within the system. Accordingly, this configuration allows for fast and easy component replacement or removal in a "plug-and-play" type configuration.

In other embodiments, the trays can have different heights depending on the COTS and/or other equipment carried by the trays. For example, in certain embodiments the cases can include racks 494 with rails 493 for receiving the trays or lips on the trays (shown in FIGS. 4A and 4E). The rails can be spaced apart to receive trays having a selected height. Trays that are taller than the selected height can be received by the case by skipping rails. For example, a tray having a height that is twice the selected height can be installed into the case in place of two individual trays, each having the selected height. In various embodiments, cases can be sized and configured to receive varying numbers of trays (e.g., one or more trays).

As shown in FIG. 4D, in certain embodiments the trays or support members 402 can be formed with slidable mounting structures (e.g., lips or rails) on each side to allow easy removal and integration into the main case. The trays can be formed from plate steel and/or other materials including, but not limited to, carbon fiber, reinforced plastics, or other composite materials. The trays can include an universal clamping arrangement on each side (or the bottom) to provide some level to universal clamping to secure rack mounted equipment to the tray. For example, as shown in FIG. 4H a strapping device 498 can be used to secure a COTS component to the tray.

Figure 4F:
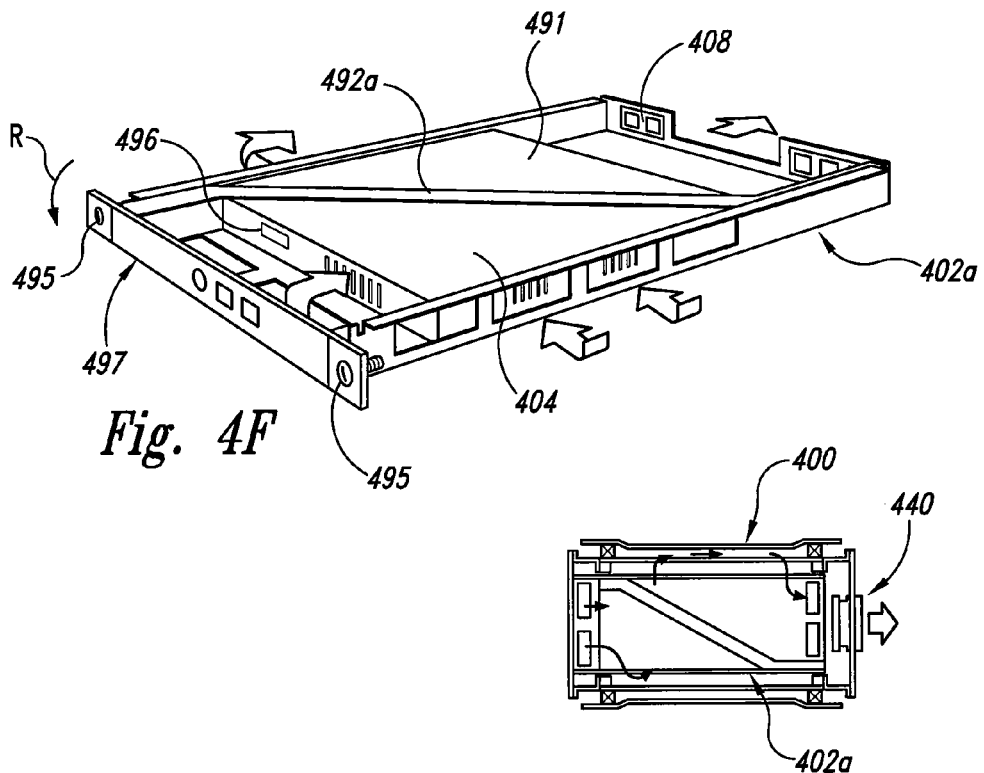

As shown in FIG. 4F, the tray can also include a face plate 497 that can be operably coupled to one or more components carried by the tray. In selected embodiments, face plate 497 can be movable relative to the rest of the tray. For example, in the illustrated embodiment at least a portion of the face plate 497 is hinged at the bottom so that the face plate can rotate as shown by Arrow R in FIG. 4F. This feature can allow the face plate 497 to be folded down exposing a portion of a COTS component carried by the tray. For example, in the illustrated embodiment a USB port 496 is exposed on a COTS component 491 when the face plate 497 is folded down. This feature can be useful when the COTS component includes elements that are not routinely accessed during normal operation, but may periodically be accessed for software upgrades, maintenance, special operations, and/or the like. In the illustrated embodiment, portions of the face plate include fastener elements 495 for securing the tray to the rail of the case (discussed above with reference to FIGS. 4A and 4E). In other embodiments, the trays can be secured to a portion of the case or a portion of a housing other arrangements.

As discussed above, the appliance can include a cooling system with fans and air filter(s). The direction of the airflow on conventional rack mounted equipment and/or COTS components varies from a front-to-back or right-to-left direction. To accommodate this, flow control devices such as passageways, air dams, form-fit baffles and/or the like can be used to direct airflow in a combination of directions to insure that cooling air flows through the COTS components. The flow control devices can be made from various materials, including plastics, foams, composites, metals, woods, and/or the like. For example, in selected embodiments the flow control devices can include blade seals, foam seals, flexible air-impervious barriers, and/or the like.

Figure 12:
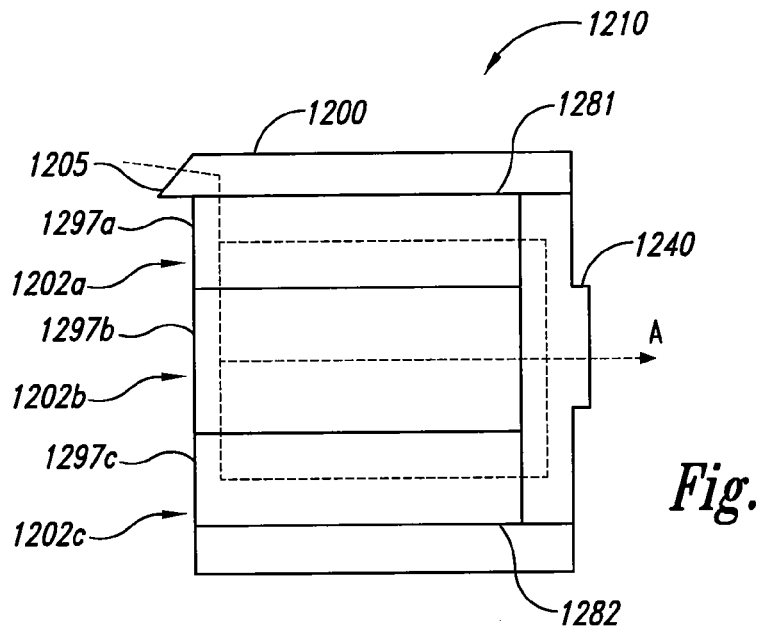
FIG. 12 is a partially schematic cross-sectional side elevation of a portion of an appliance in accordance with selected embodiments of the invention.

FIG. 12 is a partially schematic cross-sectional side elevation of a portion of an appliance 1210, similar to the appliances discussed above with reference to FIGS. 1, 2, and 4, in accordance with selected embodiments of the invention. In FIG. 12, air A is drawn through a portion of the appliance 1210 via one or more fans 1240. In the illustrated embodiment, the air enters the case 1200 of the appliance through a filter 1205 and flows through three trays or drawers, shown as a first drawer 1202*a* with a first face plate 1297*a*, a second drawer 1202*b* with a second face plate 1297*b*, and a third drawer 1202*c* with a third face plate 1297*c*. As discussed in further detail below, various flow control devices can be used to direct the air through various components (e.g., COTS components) carried by the drawer.

In FIG. 12, the air A entering the appliance 1210 flows between behind the face plates of the drawers and between the drawers via passageways in the bottom of the first and second drawers 1202*a* and 1202*b*. For example, in selected embodiments the face plates and the passageways in the bottom of the drawers can form a plenum allowing air flowing through the filters to be distributed to and all of the drawers. The air A can then flow through the drawers and exit the rear of the drawers into a passageway (e.g., another plenum) formed between the drawers and the rear of the case 1200. The air A can then exit the case via the one or more fans 1240. Various flow control devices can be used to direct the air A through various components carried by each drawer and/or to at least approximately seal portions of the drawer and/or components on the drawer against other drawers, portions of the case 1200, and/or other structures.

For example, in FIG. 12 the first drawer 1202*a*, components carried by the first drawer 1202*a*, and/or flow control devices proximate to the first drawer 1202*a* can be used to at least approximately seal against plate 1281 to insure that air flows through components carried by the first drawer or through passageways in the bottom of the first drawer to the second drawer. Additionally, in FIG. 12 a plate 1282 is position below the third drawer 1202*c* to insure that a substantial portion of air does not flow from the front of the case 1200 to the rear of the case 1200 under the third drawer. Furthermore, the second drawer 1202*b*, components carried by the second drawer 1202*b*, and/or flow control devices proximate to the second drawer 1202*b* can be used to at least approximately seal against the bottom of the first drawer 1202*a* to insure that air flows through components carried by the second drawer or through passageways in the bottom of the second drawer to the third drawer. Similarly, the bottom of the second drawer 1202*b* can be used to control airflow through the third drawer 1202*c* in a similar manner.

Figure 4G:
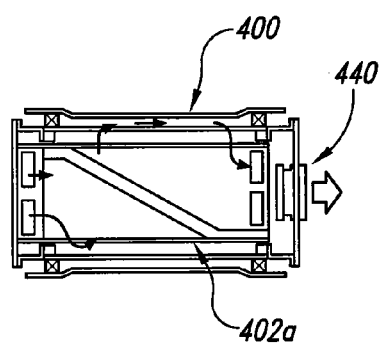
Figure 4H:
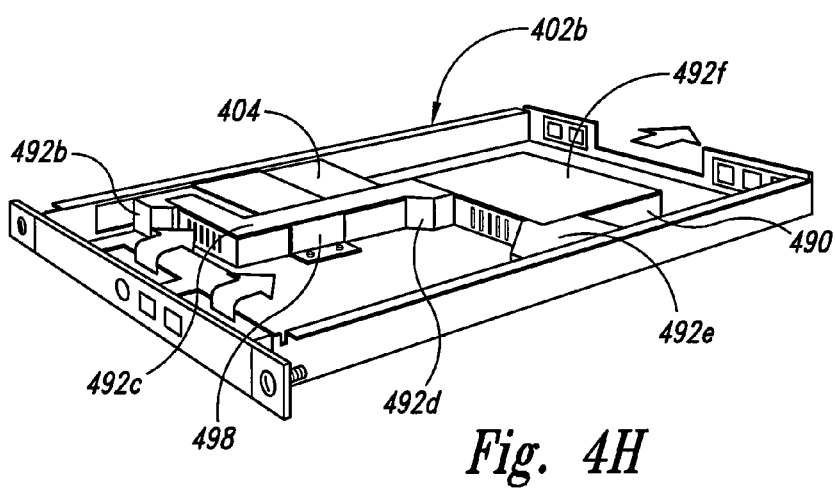

FIG. 4D shows the first support member 402*a* without any COTS components, FIG. 4F shows the first support member 402*b* with the COTS component 491 and a first flow control device 492*a*. In the illustrated embodiment, the first flow control device 492*a* is made of foam and carried on a portion of the top of the COTS component 491. The first flow control device 492*a* is configured to at least approximately seal against another surface (e.g., the bottom of an adjacent drawer, a portion of the case, and/or a plate coupled to the case) to insure that as air (shown by Arrows A) is drawn through the case by a fan 440 (shown in FIGS. 4B and 4G), the air is directed through the COTS component 491 as shown in FIG. 4G. In other embodiments, the first flow control device 492*a* can be carried on the other surface (e.g., the bottom of an adjacent drawer, a portion of the case, and/or a plate coupled to the case) and positioned to at least approximately seal against the COTS component 491 when the first support member 402*a* is positioned in the appliance.

Because the first flow control device 492*a* in FIG. 4F is placed diagonally across the top of the COTS component 491 (e.g., creating a diagonal seal with a surface above the COTS component 491), air is directed laterally through the COTS component 491 as it flows toward the rear of the support member 402*b* (as shown by Arrows A in FIG. 4G). In FIGS. 4F and 4G, the support member 402*b* has passageways positioned on the side of the support member 402*b* to facilitate the lateral flow of air through the COTS component 491. Additionally, because in the illustrated embodiment the first flow control device 492*a* is made of foam, the first flow control device 492*a* can also serve to dampen the vibration and or shock received by the COTS component 491 when the first flow control device is positioned against another surface.

FIG. 4H shows the second support member 402*b* with second, third, fourth, fifth, and sixth flow control devices (492*b-f* respectively) positioned proximate to COTS components 404 and 490. The flow control devices are positioned and configured to insure that air is directed through the COTS components 404 and 490 when the second support member is positioned in the case 400 and the fan 440 draws air through the case. In other embodiments, the appliance can have different arrangements, including more, fewer, and/or different flow control devices. For example, in other embodiments flow control devices can be positioned on other portions of the appliance. For example, the flow control devices can be positioned on the case, the sides of the support members, and/or the bottom of the support members to control/direct air flow proximate to the support members and associated COTS components. Additionally, various passageways can be positioned on different portions of the support members or on other portions of the appliance to direct/control cooling air flow.

As discussed above, in selected embodiments the support members or trays can be inserted into a case to form at least a portion of an integrated communication appliance and a management subsystem of software management system can be used to integrate the various components of the appliance. In selected embodiments, the management subsystem can be distributed among various components. For example, in selected embodiments the management subsystem can include one or more housing processors, one or more support member processors, portions of the COTS components carried by the appliance, and portions of a remote computing system (e.g., the remote computing system 124 shown in FIG. 1).

Figure 13:
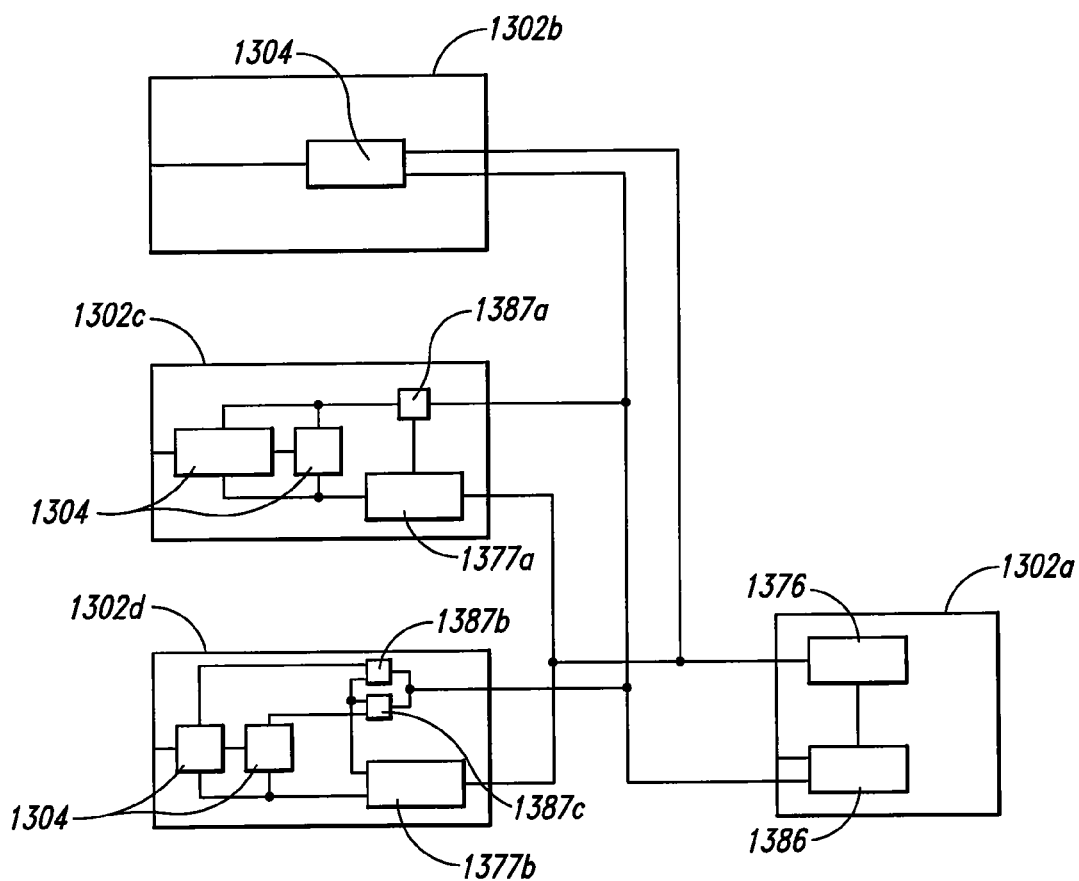
FIG. 13 is a partially schematic illustration of a portion of an appliance in accordance with certain embodiments of the invention.

FIG. 13 is a schematic illustration of multiple trays or support members 1302 of a communication appliance in accordance with embodiments of the invention. In FIG. 13, a first support member 1302a or first tray carries a housing processor 1386 (also referred to as a case controller). The case controller is operably coupled to a COTS component on a second support member 1302b or second tray, to a first support member processor 1387a (also referred to as a first tray controller) on a third support member 1302c or third tray, and to a second support member processor 1387b (also referred to as a second tray controller) on a fourth tray or support member 1302d. Although the trays in FIG. 13 are schematically shown as being laterally disposed, in the appliance of the embodiments discussed above the trays are arranged vertically within the ruggedized case.

In selected embodiments, the case controller can communicate with the COTS component 1304 on the second tray and to the COTS components on the third and fourth trays via the corresponding tray controllers. In selected embodiments, the tray controllers can provide an interface between the case controller and the corresponding COTS components (e.g., to provide a "plug-and-play" environment, to provide interface compatibility, etc.) and/or other component carried by the corresponding tray. In other embodiments, the tray controllers (alone or in combination with the case controller) can also monitor and/or control various components carried on the corresponding trays. For example, in selected embodiments a tray controller can monitor temperature sensors associated with various components on the corresponding tray, monitor and/or control electrical power supplied to various components, monitor software performance, monitor fault conditions, monitor or command operational modes, monitor general operation parameters, and/or the like.

In other embodiments, a MAC address (e.g., Media Access Control address) for each component (e.g., for each COTS component) mounted on the tray can be coded into the corresponding tray controller. Accordingly, other portions of the management subsystem (e.g., a case controller) can uniquely identify the tray and/or its' associated components. In selected embodiments, this feature can aid in providing a "plug-and-play" environment, in enhancing communication between components, and/or in enhancing appliance operation.

In certain embodiments, the case controller can coordinate with, communicate with, and monitor various components associated with the appliance via the individual tray controllers and/or by directly communicating with selected components. In selected embodiments, the case controller can coordinate with, communicate with, and monitor components in other cases (e.g., when cases coupled together). For example, in certain embodiments a case controller in a first case can communicate with case controller(s), tray controller(s), and/or components in other cases. In some embodiments a PICAXE 28X microcontroller or PICAXE 18X microcontroller can be suitable for use as a case controller.

Although in the illustrated embodiment, the case controller and tray controller are shown coupled to COTS components, in other embodiments the case controller and/or tray controllers can be coupled to other components. For example, in selected embodiments the case controller and/or tray controllers can be coupled to temperature sensors to monitor temperatures associated with various appliance components and operably coupled to fans in the case to control cooling airflow. In still other embodiments, a case controller can communicate with a remote computing system (e.g., the remote computing system 124 discussed above with reference to FIG. 1). This feature can allow an operator to perform tasks on various appliance components remotely (e.g., recycle power, update software, run diagnostics, etc.). As discussed in further detail below, in selected embodiments the management subsystem can include one or more annunciators configured to annunciate or communicate selected information associated with one or more appliance components (e.g., operational conditions, fault conditions, system status, etc.). For example, in certain embodiments a case controller and/or tray controllers can monitor various appliance components and be operably coupled to the annunciator(s) to provide status information to an operator.

In FIG. 13, the first tray also carries a first portion 1386 of a power subsystem that is connectable to an external power source and is capable of supplying power to various appliance components. In the illustrated embodiment, the power subsystem is controlled, at least in part, by the management subsystem. In other embodiments, the power subsystem can be controlled in other manners (e.g., by a user operated switch or by a separate computing system/processor). In the illustrated embodiment, the power subsystem includes multiple relays 1387. For example, in FIG. 13 the first portion 1386 of the power subsystem is operably coupled to the COTS component 1304 on the second tray, to a first relay 1387a on the third tray, and to second and third relays 1387b and 1387c on the fourth tray.

Accordingly, in the illustrated embodiment the first portion 1386 of the power subsystem provides electrical power directly to the COTS component 1304 on the second tray and to the components 1304 on the third and fourth tray through the corresponding relays. In FIG. 13, the first relay 1387a is coupled to and controlled by the first tray controller and the second and third relays 1387b and 1387c are coupled to and controlled by the second tray controller. Additionally, in FIG. 13 the first portion 1386 of the power subsystem is operably coupled to and controlled by the case controller.

Therefore, in selected embodiments power to all of the COTS components 1304 can be cycled by the first portion 1386 of the power subsystem. Additionally, power to both of the COTS components 1304 on the third tray can be cycled via the first relay 1387a. Furthermore, power to the two COTS components 1304 can be cycled individually by the second and third relays 1387b and 1387c, respectively. In selected embodiments, this feature can allow a remote operator to cycle power (e.g., perform a hard reset) on individual COTS components via the corresponding case controller, tray controller, and/or relay, for example, via the remote computing system 124 shown in FIG. 1. In other embodiments the power subsystem and management subsystem can have other arrangements. For example, in certain embodiments at least some of the relays can be integral to, or be part of, the tray controllers.

Figure 4I:
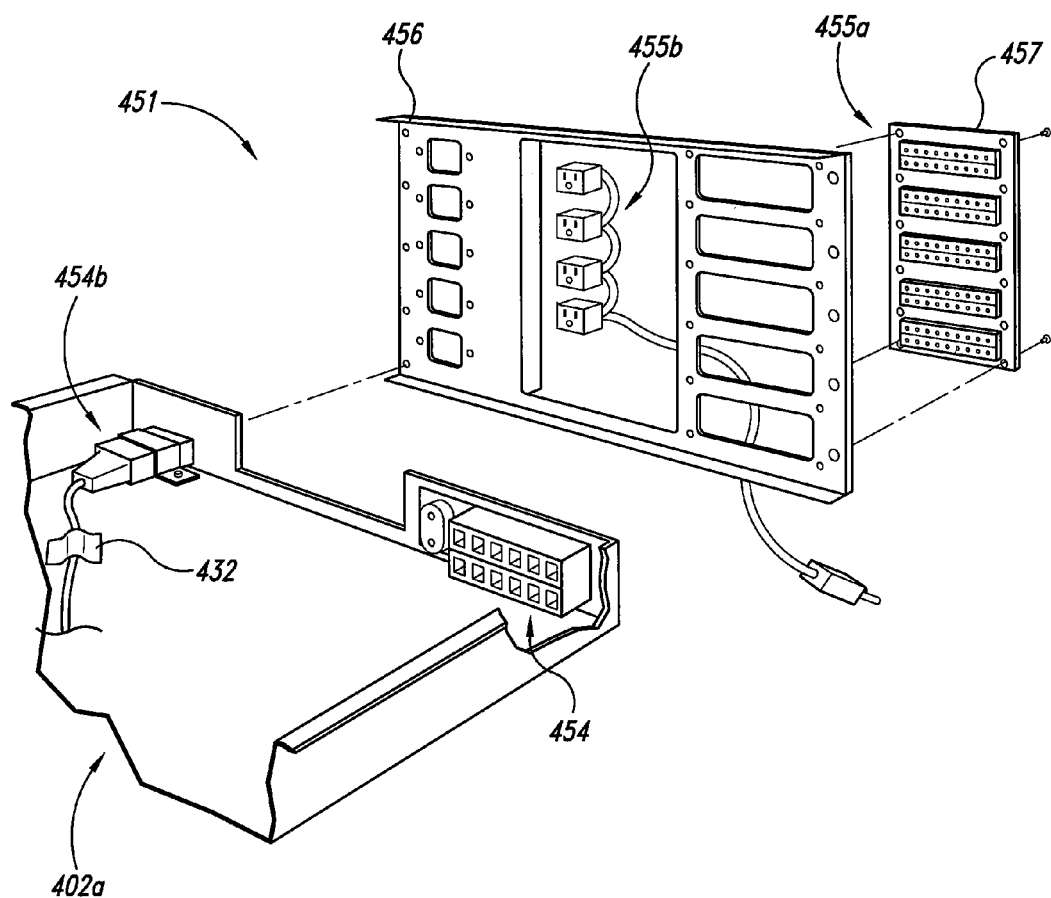

As shown in FIG. 4I, an interconnection subsystem 451 can be carried by a communication appliance (e.g., carried by the case or housing of a communication appliance) and be configured to operably couple various COTS components to a portion of a management subsystem (e.g., housing processor) and/or to electrical power (e.g., via a portion of the power subsystem). In the illustrated embodiment, the interconnection subsystem includes one or more support member portions 454 carried by one or more support members and one or more housing portions 455 carried by a case or a portion of the appliance housing. In FIG. 4I, the first support member 402a or tray is shown carrying a first support member portion 454a configured to operably couple COTS components on the tray with a housing processor. The COTS component can be coupled directly to the first support member portion 454a or to the first support member portion 454a via a tray controller.

In selected embodiments, the first support member portions 454a can include RJ45 jacks and/or RJ11 jacks.

In the illustrated embodiment, the tray also carries a second support member portion 454b configured to operably couple a COTS component to at least a portion of a power subsystem (e.g., so that electrical power can be provided to the COTS). In certain embodiments, the COTS component can be coupled to a relay and the relay can be coupled to a first portion of the power subsystem via the second support member portion 454b. In other embodiments, the relay is not located on the tray and the COTS component can be coupled to the relay via the second support member portion 454b. In selected embodiments, the second support member portion 454b can include a male C14 style plug.

In FIG. 4I, the interconnection subsystem 451 includes first housing portions 455a that are coupleable to the first support members 454a on the trays. The interconnection also includes second housing portions 455b that are coupleable to the second support member portions 454b on the trays. In the illustrated embodiment, the first housing portions 455a and the second housing portions 455b are carried by a support 456 that can be coupled to a case (e.g., coupled in the rear of the case 400 by the fan(s) 440 shown in FIG. 4A). The support 456 can be positioned so that the first and second housing portions 455a and 455b receive the first and second support member portions 454a and 454b when the tray is slid rearwardly into the case (e.g., installed into and/or received by the case) and disconnected when the tray is pulled out of the case (e.g., removed or uninstalled from the case). For example, in selected embodiments the first housing portions 455a can include spring pins configured to interface with RJ45 or RJ11 jacks and the second housing portions 455b can include C13 receptacles configured to interface with C14 plugs. As discussed above, the second housing portions 455b can be operably coupled to a portion of the power subsystem to supply power to the COTS carried by the corresponding trays. For example, when a first portion of the power subsystem is carried by a tray, the first portion of the power subsystem can be coupled to components on other trays via the interconnection subsystem. In other embodiments, a first portion of the power subsystem includes a cable connectable to a power source and the interconnection subsystem couples the COTS components to the cable.

Also as discussed above, the first housing portions can be coupled to a case controller to operably couple COTS components and/or a tray controller carried by the corresponding tray to the case controller. For example, in selected embodiments a case controller can be carried on a tray and coupled to a data bus or a printed circuit board 457 by the corresponding first support member portion 454a and first housing portion 455a of the interconnection system. Accordingly, a case controller carried by a tray can be coupled to components on other trays by the interconnection subsystem via the printed circuit board and corresponding first support member portions 454a and first housing portions 455a. Additionally, in selected embodiments components on one tray can be operably coupled to components on other trays via the printed circuit board, corresponding first support member portions 454a, and corresponding first housing portions 455a without necessarily having to route communication through a case controller.

In the illustrated embodiment, a portion of a cable connecting a COTS component to the second support member portion 454b of the interconnection subsystem 451 is shown secured to the first tray via a securing element 432. In selected embodiments, the securing element snugly holds the cable and wires carried on the tray to prevent the wires and cables from being damaged when the tray is slid into the case and/or removed from the case. Additionally, in certain embodiments the securing element holds the cables and wires against the tray to help prevent the cables and wires from rattling or otherwise moving and accidentally becoming disconnected due to vibration and shock, for example, which an appliance might experience during shipping. Securing elements can include adhesive materials, clips, ties, straps, clamps, brackets, shrink wrap, and/or other securing devices.

Figure 5A:
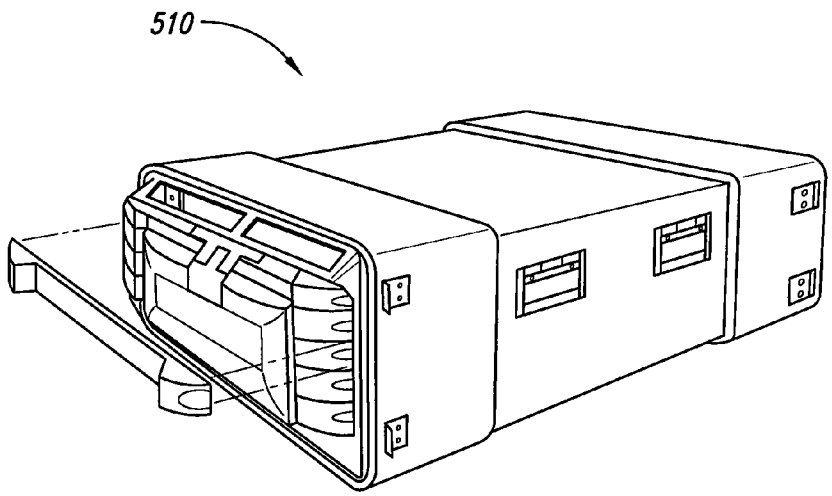
FIGS. 5A-E illustrate features of an appliance in accordance with certain embodiments of the present invention.
Figure 5B:
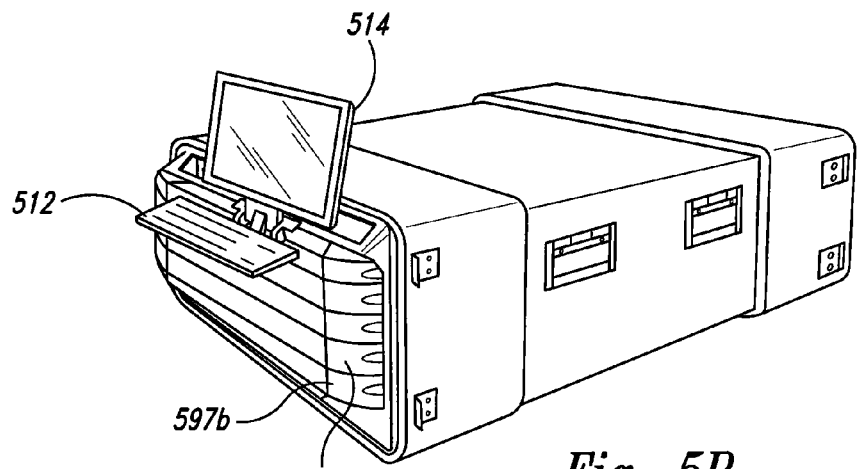
Figure 5C:
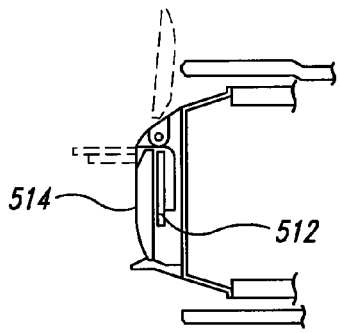

FIGS. 5A-5E illustrate a communication appliance 510 in accordance with other embodiments of the invention. In the illustrated embodiment, the appliance 510 includes a deployable keyboard 512 and display 514 for interfacing with various appliance components. FIG. 5A is an isometric illustration showing the keyboard and display in a retracted position. FIG. 5B is an isometric illustration showing the keyboard and display in the deployed position. FIG. 5C is a partially schematic side elevation illustrating how the keyboard and display move between the retracted and deployed positions. In selected embodiments, the display 514 can include a touch screen for interfacing with various appliance components.

Figure 5D:
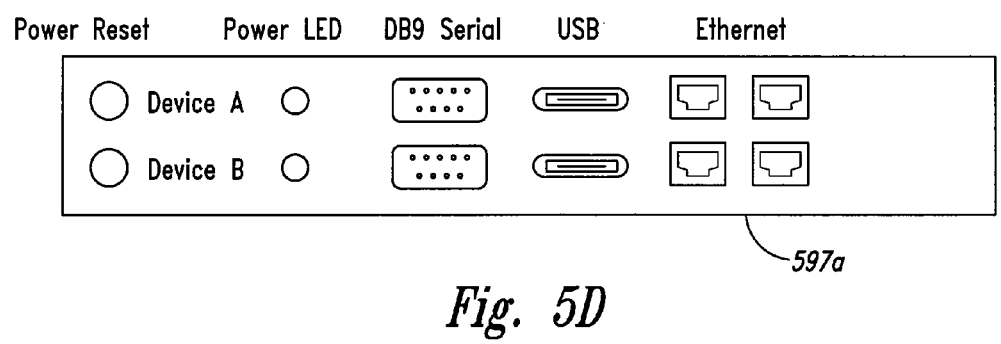

FIG. 5D is a partially schematic illustration of a first face plate 597a of a first tray of the appliance 510. In the illustrated embodiment, the first face plate 597a includes various interface elements such as power reset buttons, LED displays, DB9 Serial ports, USB ports, and Ethernet connections for one or more COTS components associated with the first tray. In other embodiments, the face plate can have other arrangements and/or various interface elements can be located on other portions of the appliance 510.

Figure 5E:
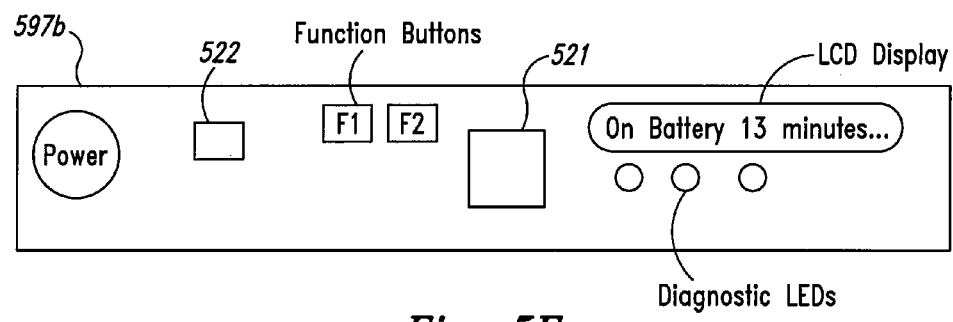

FIG. 5E is a partially schematic illustration of a second face plate 597b of a second tray of the appliance 510. In the illustrated embodiment, the second face plate 597b includes various interface elements such as a power button (e.g., a single power button for "powering up" the appliance 510), function buttons, diagnostic LEDs, a LCD display, an annunciator 521, and a sensor 522. In the illustrated embodiment, the annunciator 521 can include audio and/or visual devices and can be coupled to a case controller. For example, in certain embodiments the annunciator can include a multicolor light that can be seen from a distance. The light can display green for normal operation, amber as a caution, and red as a warning. For example, the case controller can cause the light to show green when all monitored components are operating normally, amber when a component has a minor malfunction/condition, and red when a component has suffered a critical failure or other type of critical condition. As discussed above, in selected embodiments the case controller can monitor software and hard wear operation (e.g., health). In certain embodiments, the LEDs and/or the LCD display can be used to provide an operator more information about a failure mode. In some embodiments the annunciator 521 can also include an audio device that sounds an alarm when certain faults are present (e.g., when an over temperature condition is detected).

In selected embodiments, the sensor 522 can include a camera 522 for monitoring the area surrounding the appliance 510. For example, in selected embodiments the camera can serve as security camera, allowing an operator to monitor activity around the appliance 510. In other embodiments, the sensor 522 can include a motion detector. In still other embodiments, the appliance can include multiple sensors 522, other types of sensors 522, and/or sensors 522 located on other portions of the appliance to monitor conditions on and/or proximate to the appliance.

Figure 6:
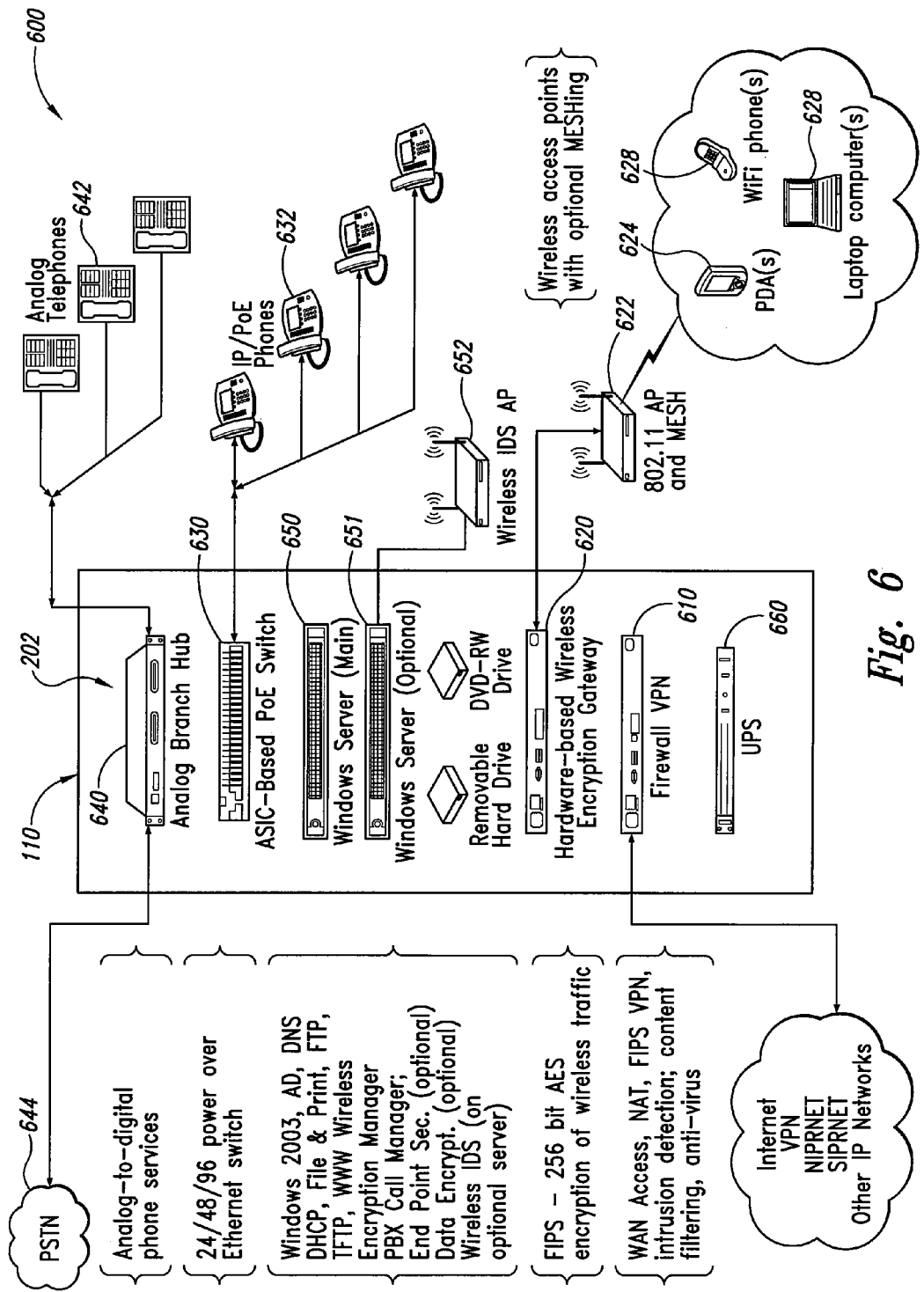
FIG. 6 is a block diagram illustrating internal COTS components supported and housed by the system to provide IT and communications services in accordance with selected embodiments of the present invention.

Referring to FIG. 6, an example of internal COTS equipment supported and housed by the appliance 110 to provide IT services is shown as diagram 600. The appliance 110 may contain some or all of the COTS components 202 shown in the figure. For example, the appliance may contain a firewall 610 that provides anti-virus security, content filtering, VPN, NAT, IPS, or other security and protective capabilities. Also, the appliance may contain a wireless encryption gateway 620 that provides encryption for wireless communications via a wireless access point (AP) 622, MESH components, or other wireless communications modules. The gateway 620 may use AES or other encryption techniques. Access points may be FIPS 140-2 certified 802.11x (such as 802.11b, 802.11g, and so on) access points, may be 802.11x meshing base stations, may be NSA Type-1 classified 802.11x access points, and so on. Any or all of the access points may provide communications to and from personal digital assistants 624, mobile phones 626, laptops 628, and other wireless-enabled devices. Furthermore, there may be a network switch 630 that provides communications for IP/PoE phones 632 or other telecommunications devices. Also, the appliance may include an analog branch hub 640 that provides communications for analog telephones 642 and other analog communication devices to PSTN networks.

The appliance also comprises a server 650 (plus an optional backup or additional server 651 that may also be connected to an access point, such as an IDS AP 652). The server 650 may be a Pentium 4 server, running the windows operating system. The server 650 may control and store some or all aspects of the operations of the appliance and the operations of each of the components. For example, the server may contain VoIP call manager and administration software, anti-virus software, system management software (further discussed herein), management software used in encryption gateway authentication, an active directory for authentication, domain controllers, and services such as TFTP, DNS, DHCP, WWW, FTP, email, or other services. The appliance 110 may also contain a display device (such as an LCD-based foldout monitor terminal) or related inputs, permanent and removable hard drives, other removable drives (DVD R/W, USB, firewire, and so on), and a UPS battery back-up and power conditioner 660.

The system implements the above COTS components 202 in a configuration that optimizes the performance of the appliance 110. For example, a combination of quality of service settings on the switch, firewall filtering settings, and encryption gateway settings with a software-based call manager enables the system to provide high-quality IT services in edge environments with a large number of users and a minimal setup time.

The system also provides security against hackers, intrusion, spyware, viruses and other electronic attacks through a rigorous security assurance method. For example, the security methods include updating software, firmware, and patches to current and secure versions, turning on patch updating for individual devices via a central patching service, disabling unneeded services and capabilities, disabling unneeded ports and communications interfaces, removing unnecessary or unused software. In some cases, the system performs such operations via automated scripts or manual steps. The security methods also employ numerous security analysis tools, such as COTS security analyzers, third party protocol analyzers, externally executed "attack" simulation tools, web-based analysis tools and other tools that ensure that the system is resistant to known attacks, and that well-known or discovered vulnerability issues are eliminated.

Referring to FIG. 7, a block diagram illustrating the software architecture 700 of the management software 702 employed by the system is shown. The management software is constructed in a modular basis so that each major function can be enhanced without adversely impacting other functions. Functional areas of the management software include abstraction of component interfaces, allowing the invention to control multiple types of components through a variety of protocols, including but not limited to SNMP, TelNet, CLI, Web Services, and HTTP and HTTPS. The management software can include a Web Services module that allows the functions of the invention to be made available to other programs, locally or remotely. The primary purpose of this is to enable administrators to manage the appliance remotely.

Components of the architecture 700 include a remote management module via Web Services 710. The module 710 allows the functions of the management software to be made available to other programs, locally or remotely. For example, module 710 enables administrators to manage the system from remote locations.

Additionally, the architecture 700 comprises an abstraction or application layer 720 that comprises device control managers 724 that control devices via device native managers 725; service managers 723 that monitor the health of the system and its components, including monitoring the health of the MSMS software system; business logic managers 722 (such as a core module) that interact with user and configuration databases 726, such as active directory 727; a scheduler manager 721 that manages timed services; and several other modules. The application layer also interacts with a user interface layer via WinForms 732 or other interfaces.

In the illustrated embodiment, the management software 702 is configured to control the operation and functions of the COTS components 202. For example, the management software is configured to coordinate power cycling of the UPS and the COTS components to ensure reliability of data. The management software also centralizes management functions for some or all of the COTS components, thereby allowing for coordinated device configuration management and configuration through a single point. These management functions can include adding/editing/removing users and devices, setting preferences (date, time, log handling, scheduling), allocating (and reallocating) resources and bandwidth to users, setting group policies, managing the phone systems, and establishing or controlling other operational parameters.

The management software 702 of the illustrated embodiment is configured to update the software and firmware of some or all COTS components 202 in the appliance from a remote server, a CD-ROM, or other input source. Firmware updates normally require custom support for each component. The management software centralizes and coordinates these functions.

The management software 702 can also include support for a complete suite of remote management functions including remote diagnostics and troubleshooting, remote configuration, backup services, and so on. Remote management may be performed by software running on computers that communicate with the system via any supported network infrastructure.

The management software 702 is configured to provide support for a complete suite of management functions, enabling the system to manage remotely deployed "extension" devices that increase the range of the wireless broadband communications network and/or extend the IT and communications services supported by the system into other geographic areas, through the deployment of the remote wired or wireless access points described above. The management software is also able to create 1-to-1, 1-to-many, and many-to-many relationships with various aspects of the system, creating a network of networks.

The management software 702 provides the ability to back up and restore configuration changes within the system, such as by storing these settings on encrypted USB thumb drives or other removable data storage media. In one embodiment, the COTS components 202 each have software provided by its manufacturer to control the operating configuration of that component. The software for the COTS component can include a configuration file that includes all of the operational configuration data for that component. Other COTS components have operational configuration data in multiple files or multiple locations within the component's software. The management software is configured to interface with the software of each COTS component and automatically configures all the COTS components' software for operation with the entire system. Accordingly, the management software assists in configuring the data, timing and operational parameters that allow the COTS components to work together.

The management software 702 is also configured to allow external configuration data (e.g., personnel identification data, location information, system identification information, email addresses, phone numbers, domain identifiers, task identifiers, and other task, location and/or personnel-related communication information or data) to be provided to the COTS components 202 for use during operation of the system. For example, if the system is deployed for use by 100 users at a remote location, the communications-related data for each of the users can be uploaded or otherwise added to the configuration software, and the COTS components will automatically be configured for use related to those users and their communications data.

The appliance 110 includes an integrated external thumbdrive or other drive device removably coupled to the server, such as at a USB port or other port. The system configuration data from all of the COTS components, including the server, can be downloaded as a system configuration file and stored on the external thumbdrive. If or when needed, the system's configuration and associated data can be saved (e.g., backed up) to the thumbdrive. The integrated thumbdrive can receive a removable data storage device, such as a USB flash memory stick or other data storage means, onto which the configuration data for the system can be saved, removed, and stored in a safe location. If the system's operational configuration changes, intentionally or unintentionally, the operational configuration can be restored by downloading the configuration data via the external thumbdrive.

In another embodiment, the configuration data from one system can be saved via the external thumbdrive onto a USB flash memory stick. The USB flash memory stick can then be plugged into the external thumbdrive of another system and the configuration data downloaded onto that system's server. The server of the second system can then automatically configure the entire system based upon that configuration data, so the second appliance creates an instant wired and wireless network identical to the configuration from the first appliance.

The management software system 702 of the illustrated embodiment is configured to automatically monitor the health and status of the COTS components and the interface therebetween. In one embodiment, the appliance includes monitoring software on the server that regularly monitors the COTS components operational status and can send alerts/alarms to users (such as non-technical users) letting them know about hardware problems, hack attempts, service-level problems (such as dropped calls, bandwidth problems at the backchannel, and so on). Alarm types and routing may be determined at the factory/depot and placed in a configuration file so as to allow for a variety of options such as pager alerts, email alerts, text message alerts, and so on. In some cases, the alerts are received from software interfaces and protocols in the COTS equipment and are filtered, interpreted, and possibly modified by the management software using a number of "expert rules" or policies before being sent to users or forwarded to a remote management system.

The management software is also configured to perform setup automation tasks, such as component and accessory discovery, connection re-establishment and auto-configuration. This may include running automated setup routines to discover and set up phone dialing options, phone trunking configurations (via analog or digital lines, including T1-voice), wireless channel settings, bandwidth allocation on backhaul links, and so on.

In one embodiment, the management software 702 is configured to automatically discover and configure the phone system for connection to any local phone telecommunications systems or private branch exchange (PBX) residing in a company or other organization to allow for voice or data transmission via the local phone lines. Local telecommunications systems around the world, however, have different dialing plans or protocols that a user must use in order to get access to the system (i.e., to get a dial tone). The system includes ports that can receive phone lines from a local phone system or PBX in the area where the appliance is deployed. The management software includes a program that interfaces with the system's phone services and the external phone line to automatically determine the dialing protocol for the local area. Accordingly, a user can simply plug in or otherwise activate a phone via the system, activate the dialing/trunking program, and obtain a dial tone through the local phone line.

In one embodiment, the server controls the system's phone services, causing the phone services to dial a variety of phone numbers using a variety of phone prefixes (8, 9, 1, and area codes, etc.) until a dial tone is successfully established and calls are successfully completed for local, long distance, and PBX (internal) phone calls. Once the phone calls are successfully established, the dial plan is configured in the phone services and is used for subsequent phone calls.

In another embodiment, the server controls the system's phone services, causing the phone services to dial a variety of phone numbers using a variety of settings (such as number of channels, encapsulation types like B8ZS) on a T1 or E1 digital phone connection until a dial tone is successfully established and calls are successfully completed for local, long distance, and PBX (internal) phone calls. Once the phone calls are successfully established, the dial plan and T1/E1 settings are configured in the phone services and are used for subsequent phone calls.

The management software 702 has a data reporting system that includes management status screens on a summary basis, including easy-to-understand visual and/or audible indicators. These indicators may include a management "dashboard" mode (such as with easy-to-spot "red/yellow/green" indicators for device and system functioning, as shown in the figures below). In other embodiments, the indicators can be one or more audible tones that provide an indication to a user regarding the status of the system. The audible indicators can be used with or without the visual indicators.

Figure 8A:
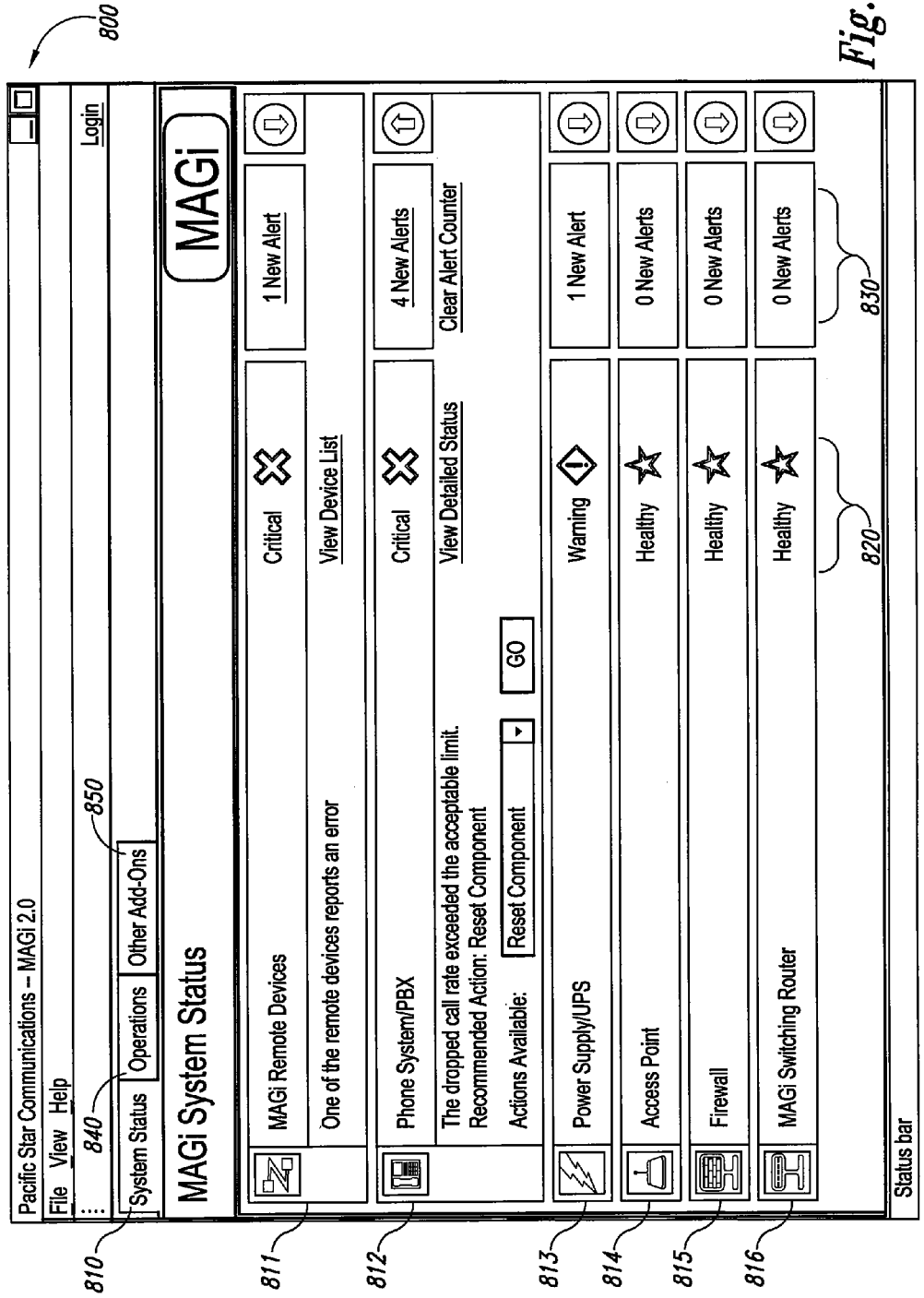

FIGS. 8A-8D are representative computer displays or web pages illustrating management functions of the management software. FIG. 8A illustrates a main status screen 800 for the management software. The system configures the management user interface so it is simple to understand and use. The displays provide control features and component indicators to configure each of the devices of the system. For example, the display may provide access to the settings for the devices needed by "in the field" users. In some cases, the displays provide a consistent look and feel from screen to screen.

The main status screen 800 may include a system status panel 810 that displays the status of some or all components of the system. For example, the system status panel 810 of FIG. 8A shows the status of remote devices 811, the phone system 812, the power supply 813, access points 814, the firewall 815, and the switching router 816. Furthermore, the status panel 810 may indicate the state of the components via indicators 820 (such as "critical," "warning," "healthy," and so on), alerts 830, or other displayed signals. In at least one embodiment, the main screen 800 may include a plurality of panels, such as operations panels 840 or other panels 850 that provide information to the user about the status of the system and configuration options for changing the configuration settings. In one embodiment, the software is configured so a user must have administration authorization in order to change the configuration settings.

The management software 702 in the illustrated embodiment includes step-by-step "Wizard" interfaces to guide non-technical users through common administrative tasks, such as adding/removing users and phones, setting system configuration, performing backups, performing diagnostics, optimizations and repairs, and other setup or management functions. The "Wizard" system provides a cohesive approach to configuring multiple COTS IT components, hiding the complexity of system components from the user. Details of the "Wizard" system are included in U.S. Provisional Patent Application No. 60/775,300, referred to above and incorporated herein.

The functionality aspects of the system in one embodiment centers on the use of the management software 702, which includes "Wizards" to control and automate the configuration of the appliance as a whole—by hiding the complexity that would otherwise be exposed to users of the appliance in the form of numerous configuration/management screens unique to each internal COTS component. The Wizard functionality in an embodiment can include a component configuration management portion that provides the ability to set device configuration of the IP addresses and administrative user names and passwords through a Wizard. A peering function provides the ability to create "peer" relationships between one or multiple systems through a wizard. It creates 1-to-1, 1-to-many, and many-to-many relationships with other instances of the system, creating a network of networks. This is accomplished through the use of establishing multiple VPN tunnels between systems, along with resetting the IP addresses of each system (and its internal components) to ensure that the IP addresses of the internal components do not conflict. The Wizard functionality can be configured to communicate with the Phone System/PBX on each appliance to establish "peer" relationships between those systems, enabling phone systems to call each other with minimal prefix dialing.

Figure 8C:
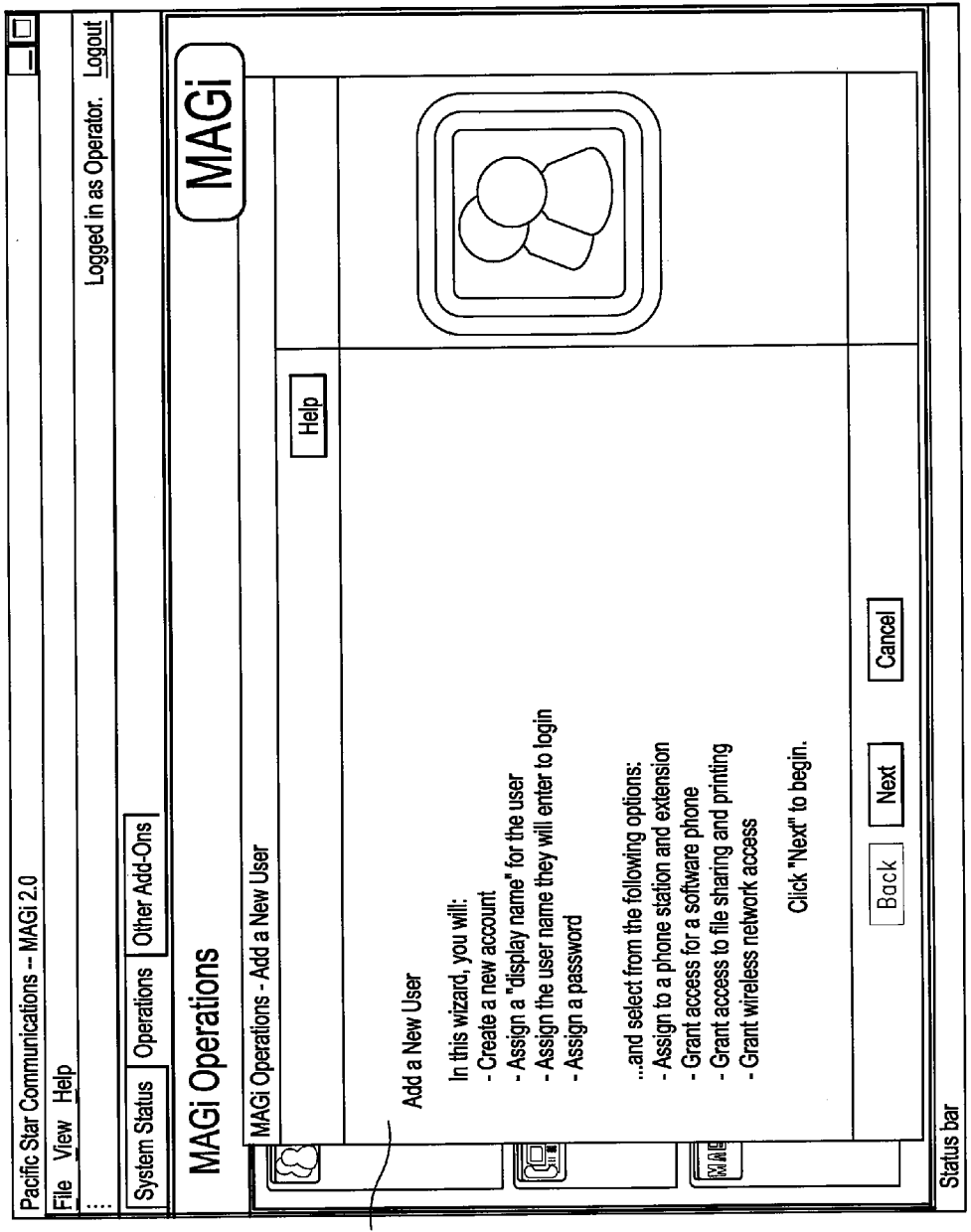
Figure 8D:
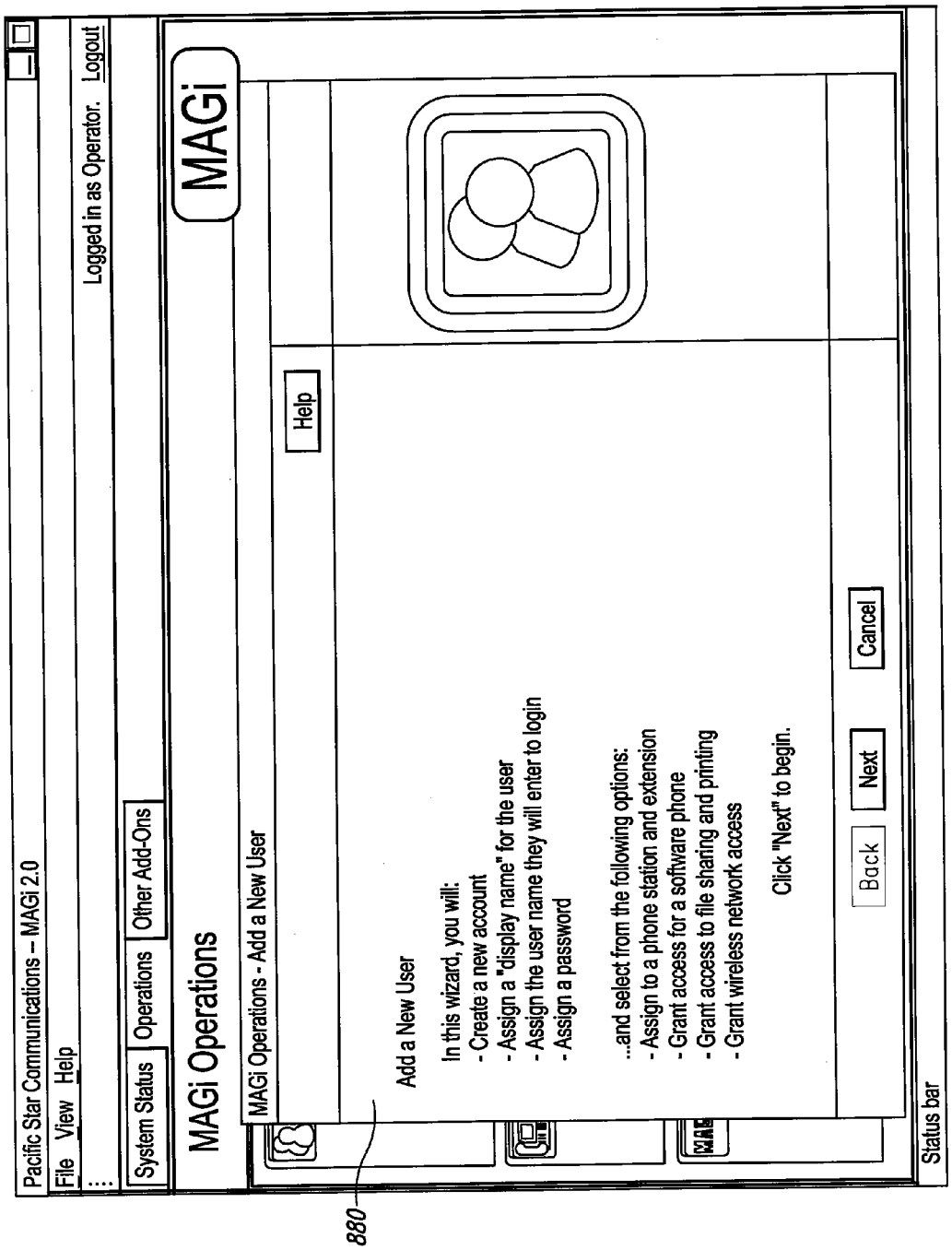

FIG. 8B illustrates a "Menu" screen 860 containing links to execute a variety of wizards. FIG. 8C illustrates a first screen 870 of a Wizard, introducing a non-technical user to the steps needed to add a new user to the system. FIG. 8D illustrates a Wizard screen 880 that prompts users to enter information into the system. In this example, the Wizard assists a user in adding a user name and login name in order to provide a new user access to the system.

The system supports a wide variety of accessories that provide additional "edge" IT and communications services. Some of these accessories include video surveillance, security, sensor networks, high-performance application and storage hosting systems, video teleconferencing systems, vehicle control systems, other command, control, intelligence, and reconnaissance systems.

The system supports a variety of voice and data communications systems connecting IT and communications services with a variety of other networks. Networks supported by the system include the Internet, private PBXs, public phone systems (PSTN/POTS), satellite networks, Free Space Optics-based networks, cellular carriers, military wired networks such as NIPRNET/SIPRNET, military wireless networks, Defense Switched Network (DSN), public agency and private emergency networks, and so on.

The system may connect to a variety of services or interconnect system components via such networks. The system may connect to such networks via many different types of data transport channels, such as T1, xDSL, ISDN, Dial-Up, Satellite, Free Space Optics, Microwave, GSM, Hardwired Network connections such as LAN connections, 802.11, WiMax, unlicensed access networks, and so on.

Figure 9:
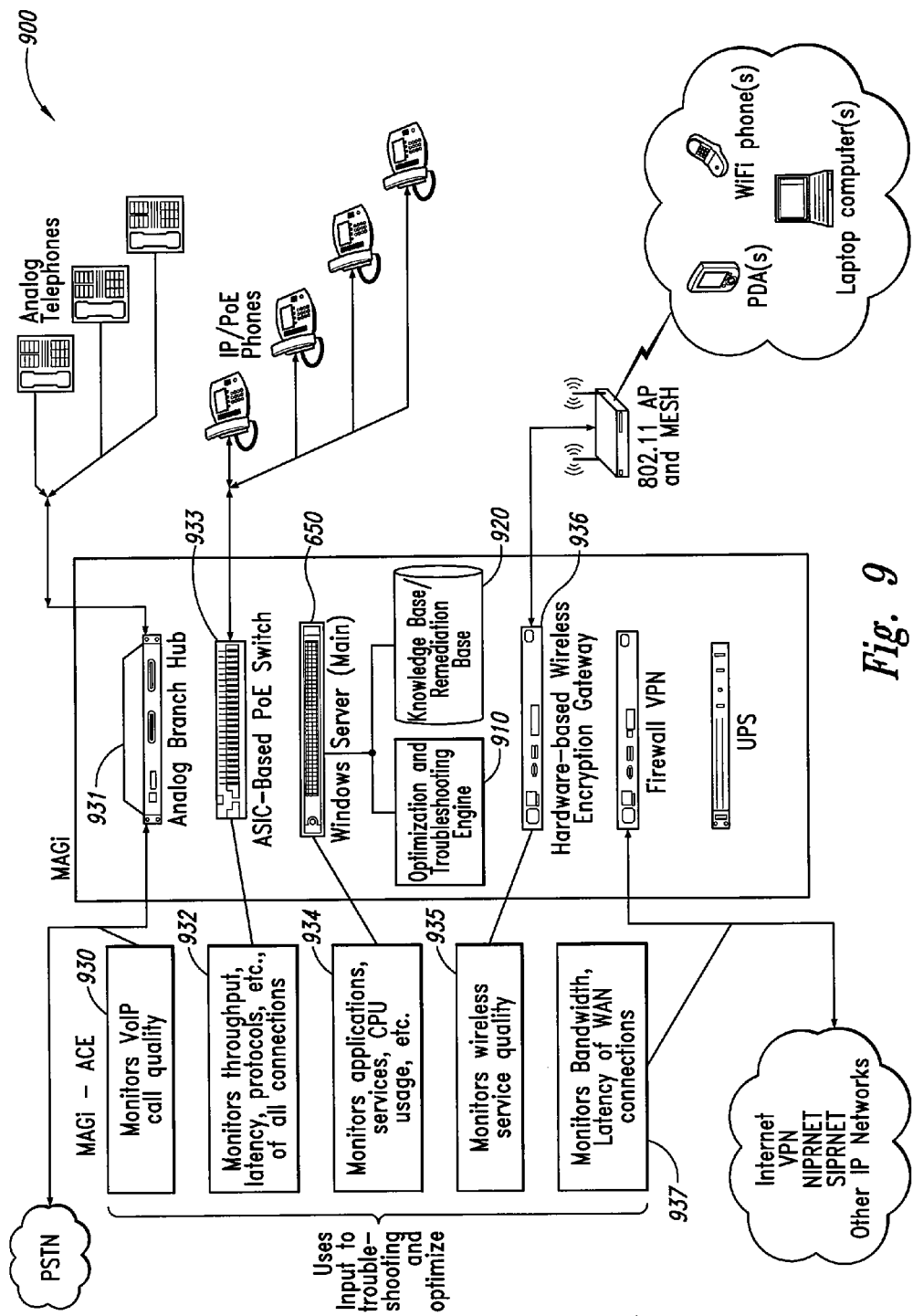
FIG. 9 is a block diagram illustrating an autonomous computing engine in accordance with certain embodiments of the present invention.

Other services and functions may be employed with the system to provide more robust communications, management, and storage using the COTS components 202. Referring to FIG. 9, a block diagram illustrating an Autonomous Computing Engine (ACE) 900 is shown. ACE may be part of the services managers 723 of the management software 702. In some cases, ACE monitors the system and optimizes the system's functions to maximize VoIP quality and application performance and maximize the number of users able to engage the system. ACE monitors the health and performance of the network, components, and applications, self-corrects and optimizes the system, and provides alerts to users containing clear and easy-to-understand remediation recommendations when ACE needs assistance. ACE may comprise an optimization and troubleshooting engine 910 and a knowledge base/remediation base 920 coupled to server 650. ACE may provide modules that monitor 930 the VoIP voice quality in a VBX branch hub 931, monitor 932 throughput, latency, protocols, and so on of system connections via a PoE switch 933, monitor 934 applications, services, CPU usage, and so on via the server 650, monitor 935 wireless service quality via a wireless gateway 936, or monitor 937 bandwidth and latency of WAN connections.

The ACE system of the illustrated embodiment provides a real-time, goal-seeking, self-optimizing engine using algorithms to manage aspects of the system. The ACE system also performs real-time monitoring of the system to pinpoint trouble areas, using a network-centric "domain-expert" model based on high level application objectives, without merely relying on simple point metrics.

The ACE system can be configured to perform iterative optimization in real time, making adjustments to systems properties, monitoring the results, and making continuous adjustments until the system performs optimally. Optionally, the ACE system can accommodate administrator inputs to tune its performance based on specific application objectives. ACE may accommodate input from administrators regarding priorities and allowable automatic remediation policies.

ACE generates alerts with simple-to-understand remediation instructions and recommendations for issues it cannot resolve itself, including pinpointing areas where total network performance is lacking or inefficient.

In some cases, the ACE engine comprises state-driven components that use multiple Bayesian models (developed in an off-line, supervised learning mode) to analyze system behavior and identify errors or opportunities for real-time optimization. ACE draws upon a knowledge base of diagnostic and remediation procedures that may be updated from time to time as additional procedures are discovered.

Figure 10:
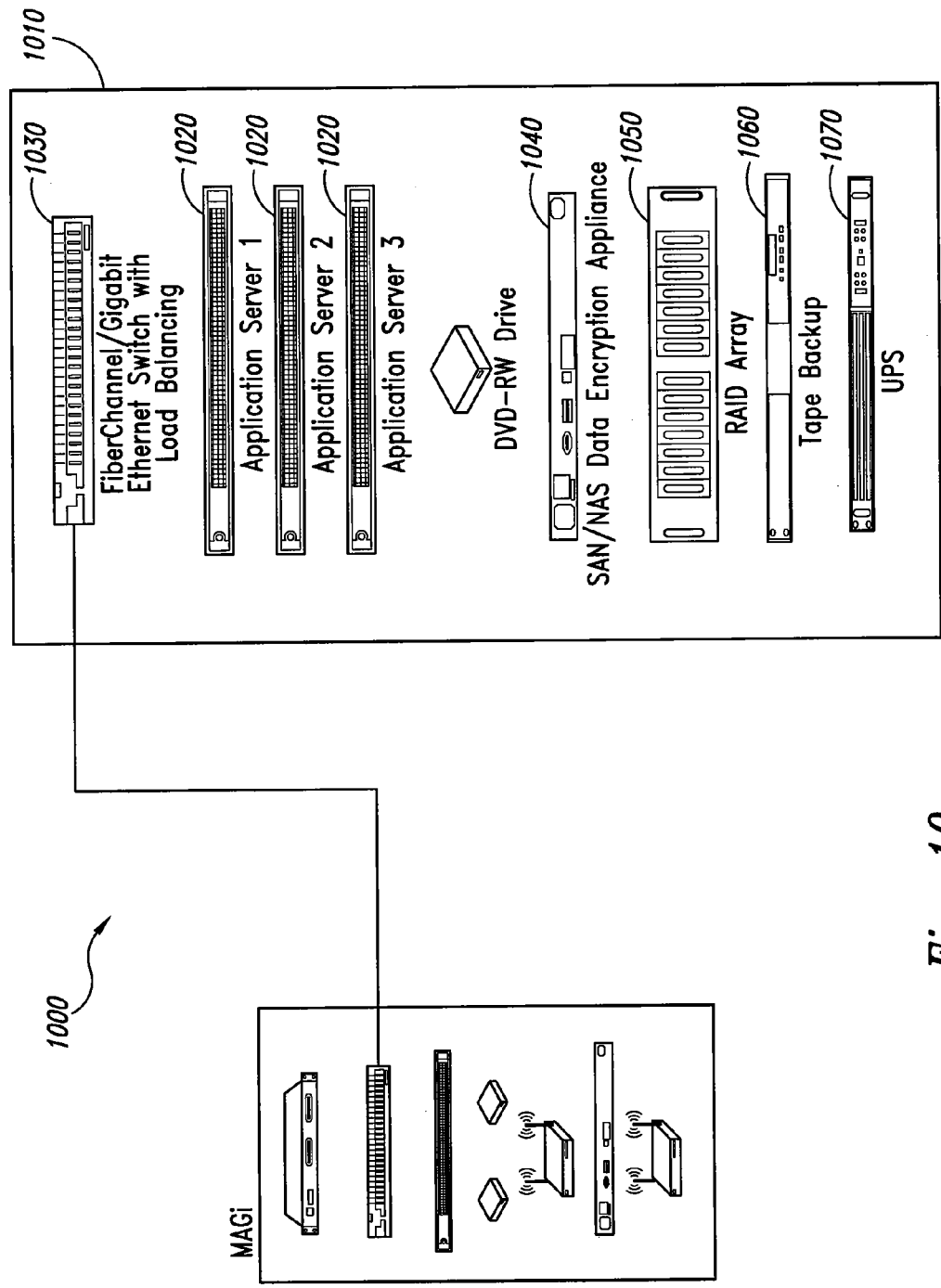
FIG. 10 is a block diagram illustrating an alternative application and storage infrastructure in accordance with selected embodiments of the present invention.

Referring to FIG. 10, a block diagram 1000 illustrating an alternative application and storage infrastructure is shown. The application and storage infrastructure 1000 supports additional large data and computationally intensive applications such as email, GIS, GPS, video processing and storage, image storage, edge-based network caching, and so on. Package 1010 is an example of the application and storage infrastructure. Package 1010 contains, for example, one or more application servers 1020, a load balancing switch/router 1030, SAN or NAS architecture network appliances (such as hardware- or software-based storage encryption appliances) 1040, a RAID disk-based storage array 1050, a tape drive 1060 for backup and archiving of data, and/or a power conditioner/UPS/battery backup 1070 component. The package 1010 may also contain system monitors, user displays or user interfaces, management software (such as the MSMS described above), cooling systems, bracketing and support systems, faceplates and other housing components, and so on. Package 1010 may be contained in a rugged case or other described housing types.

The package 1010 of the illustrated embodiment is configured to provide local data storage and application processing at the edge of the network, such as in a poorly connected environment. For example, it may provide local data storage and application processing when back-haul links are down or when data-intensive applications render low-bandwidth links (such as satellite links) ineffective.

The package 1010 can also provide local data storage and application processing that enable distributed "sensor-fusion" applications that filter/process data locally, rather than requiring extensive (and expensive) transmission of data to central data centers. The package also provides application and storage systems that are more accessible for busy, less technical, on-the-field administrators and users.

The package 1010 can also provide integrated application and storage systems, ensuring that best-of-breed third party components work together seamlessly. Data storage and application processing systems can also be integrated with the management and diagnostic software, thereby providing systems that require low IT expertise and maintenance. The package can also provide data storage and application processing systems that are environmentally hardened, thoroughly tested, and secured against attack.

Figure 11:
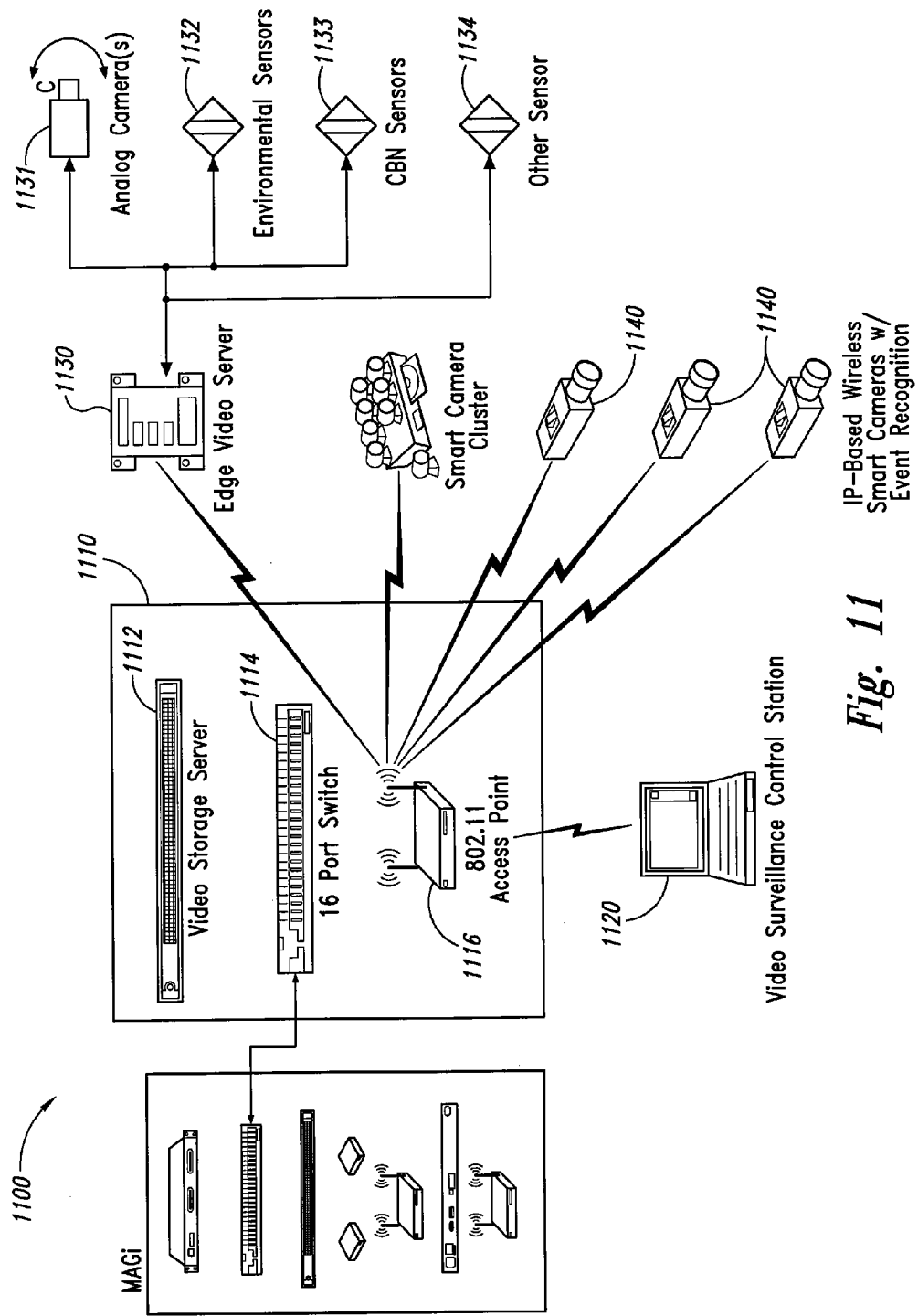
FIG. 11 is a block diagram illustrating a package that provides enhanced IT and communications services in the area of video surveillance and smart sensor networking in "edge" environments in accordance with certain embodiments of the present invention.

Referring to FIG. 11, a block diagram 1100 illustrates a package 1110 that provides enhanced IT services in the area of video surveillance and smart sensor networking in "edge" environments. For example, the system may be integrated with accessories that provide distributed, smart sensor and surveillance systems that reduce the amount of required oversight by security personnel. The system may increase the effectiveness of monitoring and surveillance while reducing personnel and other related costs.

The package 1110 may include a video storage server 1112, a switch 1114 (such as a 16 port switch), and an access point 1116. The package may communicate with a video surveillance control station 1120 via the access point. Station 1120 may be a laptop, desktop, Personal Digital Assistant (PDA), or other device capable of communicating with package 1110 and providing displays to a user.

The system uses algorithms running on edge video servers 1130 (connected to analog cameras 1131 and other sensors 1132-1134) and in smart cameras 1140 to detect suspicious events in remote or changing locations such as city streets, entryways, pipelines, container ports, airport tarmacs, bridges, military facility perimeters, chemical plant exterior storage areas, and so on.

For example, the system provides policy-based sensing and surveillance. Policy-based sensing and surveillance combines the power of digital signal processing and microprocessors with sensors (such as video cameras) to produce "smart cameras and sensors" that can trigger alarms based on a customer's rules. Thus, only threatening events need to be monitored by personnel. This provides smart, low cost, easy-to-deploy surveillance that reduces network bandwidth requirements and limits the need for fixed installations.

The system, either in collaboration with an appliance described above or standing alone, expands the abilities of traditional smart cameras and sensors and expands the uses for smart monitoring and surveillance. Embodiments of the system can be configured to provide expanded capabilities that include a multi-spectral input capability that collects information from a wide variety of devices, such as traditional video cameras, near-infrared sources, infrared, acoustic, and thermal sensors, thermal imaging devices, biometric sensors, or other sensors. The system can include analysis capabilities that create alarm policies for each input device with a variety of alarm outputs ranging from an RFID tag to a physical response, such as closing a gate or locking up a facility. The system can be configured to place the analysis functions at a sensor location, eliminating the need for high-bandwidth networks to support a device. This may expand the number of environments in which the system may be effectively deployed, because subsets of the sensor and video information may be transmitted over wireless networks.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device, or personal computer. Those skilled in the relevant art will appreciate that aspects of the invention can be practiced with other communications, data processing, or computer system configurations, including Internet appliances, hand-held devices (including PDAs), wearable computers, all manner of cellular or mobile phones, multiprocessor systems, microprocessor-based or programmable consumer electronics, set-top boxes, network PCs, mini-computers, mainframe computers, and the like. Indeed, the terms "computer," "server," "host," "host system," and the like are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a LAN, WAN, or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above detailed description of examples of the technology is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further examples. Any patents and applications and other references noted above, including any that may be listed in accompanying filing papers, are incorporated herein by reference. Aspects of the invention can be modified, if necessary, to employ the systems, functions, and concepts of the various references described above to provide yet further examples of the technology.

These and other changes can be made to the system in light of the above Detailed Description. While the above description describes certain embodiments of the invention, and describes the best mode contemplated, no matter how detailed the above appears in text, the invention can be practiced in many ways. Details of the system and method for classifying and transferring information may vary considerably in their implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the technology under the claims. While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method of making a mobile, integrated communications system that creates a self-supported broadband communications network, the method comprising:

providing one or more support members;

coupling together a plurality of commercial off-the-shelf components, wherein the plurality of commercial off-the shelf components are carried by the one or more support members;

operatively coupling a management subsystem to the plurality of off-the-shelf components, wherein a first portion of the plurality of off-the-shelf components and the management subsystem are configured to establish the self-supported broadband communications network independent of a communications system external to the mobile, integrated communications system;

providing a connection subsystem defined by at least a second portion of the plurality of off-the-shelf components and configured to provide a user with a connection to the self-supported broadband communications network; and providing a housing for receiving the plurality of off-the-shelf components and the one or more support members, wherein the one or more support members can be moved relative to the housing, and the housing is transportable with the plurality of off-the-shelf components and the support members as a unit.

2. The method of claim 1 wherein the one or more support members are removable from the housing, and the method further comprises:
   removing a first support member carrying at least one commercial off-the-shelf component;
   leaving a remaining plurality of off-the-shelf components in the housing and operationally coupled to at least one of the management subsystem and the connection subsystem;
   replacing the first support member with a second support member carrying at least a second commercial off-the-shelf component;
   identifying the second commercial off-the-shelf component with the management subsystem; and
   coupling the second commercial off-the-shelf component to the remaining plurality of off-the-shelf components.

3. The method of claim 2 wherein the management subsystem includes a first processor and at least one support member caries a second processor operably coupled to the first processor, the second support member has a third processor, and wherein coupling the second off-the-shelf component further comprises:
   positioning the second support member in the third processor to the first processor when the second support member is in an installed position.

4. The method of claim 1, further comprising:
   operably coupling the plurality of commercial off-the-shelf components to at least one mobile electrical power source using an interconnection subsystem in the housing.

5. The method of claim 1, further comprising:
   coupling a cooling system to the housing, wherein the cooling system is configured to direct airflow over at least a portion of the commercial off-the-shelf components.

6. The method of claim 1 wherein the management subsystem includes one or more annunciators, and the method further comprises:
   communicating selected information for one or more commercial off-the-shelf components to other commercial off-the-shelf components via the one or more annunciators.

7. The method of claim 1 wherein the housing includes one or more rugged cases, the method further comprising:
   coupling the plurality of rugged cases together, the rugged cases, the one or more support members, and the plurality of off-the-shelf components are configured to establish the self-supported broadband communications network.

8. A method of creating a mobile, self-contained communications network comprising:
   providing a transportable housing containing one or more removable support members, a plurality of off-the-shelf components coupled together and carried by the one or more support members, a management subsystem operatively coupled to the plurality of off-the-shelf components and at least partially carried by the housing, wherein the plurality of off-the-shelf components and the management subsystem are configured to create the mobile, self-contained communications network;
   establishing operational access to the self-contained communications network with a network connection subsystem independent of extraneous communication networks, wherein the self-contained network connection subsystem is defined by at least a first portion of the plurality of commercial off-the-shelf components and the management subsystem; and
   providing a user with connection to the self-contained communications network via the network connection subsystem with a connection subsystem defined by at least a second portion of the plurality of commercial off-the-shelf components.

9. The method of claim 8, further comprising:
   transporting the housing to a location;
   deploying the housing;
   powering on the plurality of off-the-shelf components; and
   automatically generating the self-contained communications network independent of extraneous communication networks.

10. The method of claim 9 wherein the location is a first location, and the method further comprises:
    powering off the plurality of off-the-shelf components;
    transporting the housing and the plurality of off-the-shelf components as a mobile unit to a second location; and
    powering on the plurality of off-the-shelf components when the mobile unit is at the second location, wherein powering on the plurality of off-the-shelf components automatically generates the self-contained communications network independent of extraneous communication networks.

11. The method of claim 8, further comprising:
    removing at least a first support member from the housing, wherein the first support member carries at least a first commercial off-the-shelf component;
    leaving a remaining plurality of off-the-shelf components carried by the one or more support members in the housing;
    replacing the first support member with a second support member carrying at least a second commercial off-the-shelf component;
    coupling the second commercial off-the-shelf component to the remaining plurality of commercial off-the-shelf components; and
    identifying the second commercial off-the-shelf component with the management subsystem.

12. The method of claim 8 wherein the housing carries an interconnection subsystem, a housing processor is coupled to the interconnection subsystem, a second processor is carried by at least one support member, and the method further comprises:
    connecting the second processor to the interconnection subsystem to couple the second processor to at least one of a power source and the management subsystem.

13. The method of claim 8, further comprising:
    coupling an external device to the housing;
    identifying the external device with the management subsystem; and
    connecting the external device to at least one of the commercial off-the-shelf components.

14. The method of claim 8, further comprising:
    interfacing a phone with the self-contained communications network with the management subsystem to automatically determine the dialing protocol for the local area.

15. The method of claim 8, further comprising:
    cooling the commercial off-the-shelf components with a cooling system that directs air over the support members.

16. A method of using a mobile, integrated communications system, the method comprising:
    providing a plurality of off-the-shelf components coupled together by an interconnection subsystem and configured to create a self-contained communications network, the plurality of off-the-shelf-components being carried by one or more support members, and a housing carrying the one or more support members;

deploying the housing in a first location;

establishing access to the self-contained communications network independent of extraneous communication networks at the first location;

connecting a first user to the self-contained communications network;

relocating the housing to a second location different than the first location;

establishing access to the self-contained communications network independent of extraneous communication networks in the second location; and connecting a second user to the self-contained communications network when at the second location.

17. The method of claim 16 wherein the one or more support members are a first support member, and the method further comprises:

removing the first support member; and inserting a second support member including at least a second commercial off-the-shelf component, wherein inserting the second support member automatically couples the second commercial off-the-shelf component to the interconnection subsystem.

18. The method of claim 16 wherein the one or more support members further comprises a cooling system that directs air over the plurality of commercial off-the-shelf components.

19. The method of claim 16, further comprising:

connecting a computer to the self-contained communications network, wherein connecting the computer provides broadband service to the computer independent of extraneous communication networks.

20. The method of claim 16 wherein mobile, integrated communications system includes a management subsystem, and the method further comprises:

providing the plurality of commercial off-the-shelf components with configuration data from a source external to the mobile, integrated communications system via the management subsystem.

* * * * *